US012033824B2

(12) United States Patent
Wiens

(10) Patent No.: US 12,033,824 B2
(45) Date of Patent: Jul. 9, 2024

(54) FUSE HOLDER

(71) Applicant: Xenon Inc., Irvine, CA (US)

(72) Inventor: Jordan Wiens, Irvine, CA (US)

(73) Assignee: XENON INC., Irvine, CA (US)

( * ) Notice: Subject to any disclaimer, the term of this patent is extended or adjusted under 35 U.S.C. 154(b) by 347 days.

(21) Appl. No.: 17/397,829

(22) Filed: Aug. 9, 2021

(65) Prior Publication Data

US 2023/0042166 A1 Feb. 9, 2023

(51) Int. Cl.
*H01H 85/20* (2006.01)

(52) U.S. Cl.
CPC .................................... *H01H 85/20* (2013.01)

(58) Field of Classification Search
CPC ................... H01H 85/20; H01H 85/22; H01H 2085/2065–2095
See application file for complete search history.

(56) References Cited

U.S. PATENT DOCUMENTS 10,395,878 B2 8/2019 Shah et al.
2002/0031924 A1* 3/2002 Davis .................. H01R 9/2491 439/76.2
2003/0134544 A1 7/2003 Stenius
2003/0153212 A1* 8/2003 Falchetti ............ H01H 85/2045 439/620.27
2003/0184988 A1* 10/2003 Boyd ................. H01H 85/2045 361/833
2004/0214473 A1* 10/2004 Maebashi .......... H01H 85/2045 439/620.27
2016/0050777 A1* 2/2016 Kawamura .......... H05K 5/0286 174/549
2019/0228940 A1* 7/2019 Bommersheim .. H01H 85/2005

FOREIGN PATENT DOCUMENTS

CN 208368458 1/2019
JP 5718967 5/2015

* cited by examiner

*Primary Examiner* — Jacob R Crum
(74) *Attorney, Agent, or Firm* — SHERIDAN ROSS P.C.

(57) ABSTRACT

Systems and methods are provided for a fuse holder that can store containers that have fuses stored therein. The fuse holder may include a plurality of ledges disposed therein to house one or more fuses. The fuse holder may include an attachment mechanism to a base clip. The base clip may include additional attachment mechanisms to attach both the fuse holder and the base clip to other components in a fuse box, such as various rails, ledges, or slots.

7 Claims, 20 Drawing Sheets

FUSE HOLDER

FIELD

The present disclosure is generally directed to apparatuses and devices for storing containers and, in particular, toward devices for storing and attaching containers with fuses stored therein to surfaces, rails, or other components of a fuse box.

SUMMARY

Example aspects of the present disclosure include:

A fuse holder according to at least one embodiment of the present disclosure comprises: a top surface; a bottom surface; a first sidewall disposed between and connected to the top surface and the bottom surface; a second sidewall disposed between and connected to the top surface and the bottom surface; a back panel connected to the top surface, the bottom surface, the first sidewall, and the second sidewall; at least one first ledge disposed on the first sidewall and extending toward the second sidewall; and at least one second ledge disposed on the second sidewall and extending toward the first sidewall, wherein the at least one first ledge is aligned with the at least one second ledge in a first direction, wherein the back panel comprises an attachment mechanism, and wherein the attachment mechanism connects the fuse holder to a base clip.

Any of the aspects herein, wherein the attachment mechanism comprises one or more hooks.

Any of the aspects herein, wherein the one or more hooks comprises: a horizontal portion extending from the back panel in a second direction; and a vertical portion extending from the horizontal portion in a third direction.

Any of the aspects herein, wherein the back panel further comprises: one or more holes, wherein the one or more holes are aligned below the horizontal portion of the hook in the third direction.

Any of the aspects herein, wherein the one or more holes extend from a back end outer surface to a back end inner surface.

Any of the aspects herein, wherein the one or more holes extend a first magnitude in the third direction, wherein the vertical portion extends a second magnitude in the third direction, and wherein the second magnitude is greater than the first magnitude.

Any of the aspects herein, wherein the fuse holder further comprises at least one protrusion disposed on a first surface of the vertical portion, the at least one protrusion extending in the second direction.

Any of the aspects herein, wherein the at least one protrusion extends toward the back panel.

An attachment system according to at least one embodiment of the present disclosure comprises: a base clip; and a fuse holder, the fuse holder comprising: a top surface; a bottom surface; a first sidewall disposed between and connected to the top surface and the bottom surface; a second sidewall disposed between and connected to the top surface and the bottom surface; a back panel connected to the top surface, the bottom surface, the first sidewall, and the second sidewall; a first set of ledges disposed in the first sidewall and extending toward the second sidewall; a second set of ledges disposed in the second sidewall and extending toward the first sidewall, wherein each ledge of the second set of ledges is aligned with each ledge in the first set of ledges in a first direction; and an attachment mechanism, wherein the attachment mechanism connects the fuse holder to the base clip.

Any of the aspects herein, wherein the attachment mechanism comprises one or more hooks.

Any of the aspects herein, wherein the one or more hooks comprise: a horizontal portion connected to and extending from the back panel in a second direction; a vertical portion connected to and extending from the horizontal portion in a third direction; and a protrusion disposed on a first surface of the vertical portion, the protrusion extending in the second direction toward the back panel.

Any of the aspects herein, wherein the base clip further comprises: a first concave portion disposed proximate a top end of the base clip; a second concave portion disposed proximate a bottom end of the base clip; and a flexible member disposed on a bottom end of the base clip, the flexible member comprising a securing slot and a disconnecting slot.

Any of the aspects herein, wherein the flexible member extends below a bottom end surface of the bottom end of the base clip in a first direction.

Any of the aspects herein, wherein the disconnecting slot spans a portion of the flexible member in the first direction.

Any of the aspects herein, wherein the flexible member moves from a first position to a second position, wherein, when the flexible member is in the first position, the securing slot contacts a first surface of a rail, and wherein, when the flexible member is in the second position, the securing slot is positioned a first distance from the first surface of the rail.

Any of the aspects herein, wherein the base clip comprises: one or more holes disposed on a front end of the base clip, wherein the one or more holes interface with the one or more hooks of the attachment mechanism to connect the fuse holder to the base clip.

Any of the aspects herein, wherein the fuse holder moves from a first position to a second position, and wherein the protrusion of the vertical portion contacts a first inner surface of the base clip when the fuse holder is in the second position.

Any of the aspects herein, wherein the fuse holder further comprises: a first fuse wall, the first fuse wall comprising a first wall extending from a front surface of the fuse holder in the second direction and a second wall extending from the first wall in the first direction; and a second fuse wall, the second fuse wall a third wall extending parallel with the first wall from the front surface of the fuse holder in the second direction and a fourth wall extending from the third wall toward the second wall.

Any of the aspects herein, wherein the first set of ledges comprises at least four ledges, and wherein the second set of ledges comprises at least four ledges.

A fuse holder according to at least one embodiment of the present disclosure comprises: a top surface; a bottom surface; a first sidewall disposed between and connected to the top surface and the bottom surface; a second sidewall disposed between and connected to the top surface and the bottom surface; a back panel connected to the top surface, the bottom surface, the first sidewall, and the second sidewall; at least one first ledge disposed in the first sidewall and extending toward the second sidewall; at least one second ledge disposed in the second sidewall and extending toward the first sidewall; an attachment mechanism, wherein the attachment mechanism connects the back panel to a base clip; and one or more circular slots disposed in the top surface, wherein the one or more circular slots are tapered from an outer surface of the back panel in a first direction toward a front end of the fuse holder.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
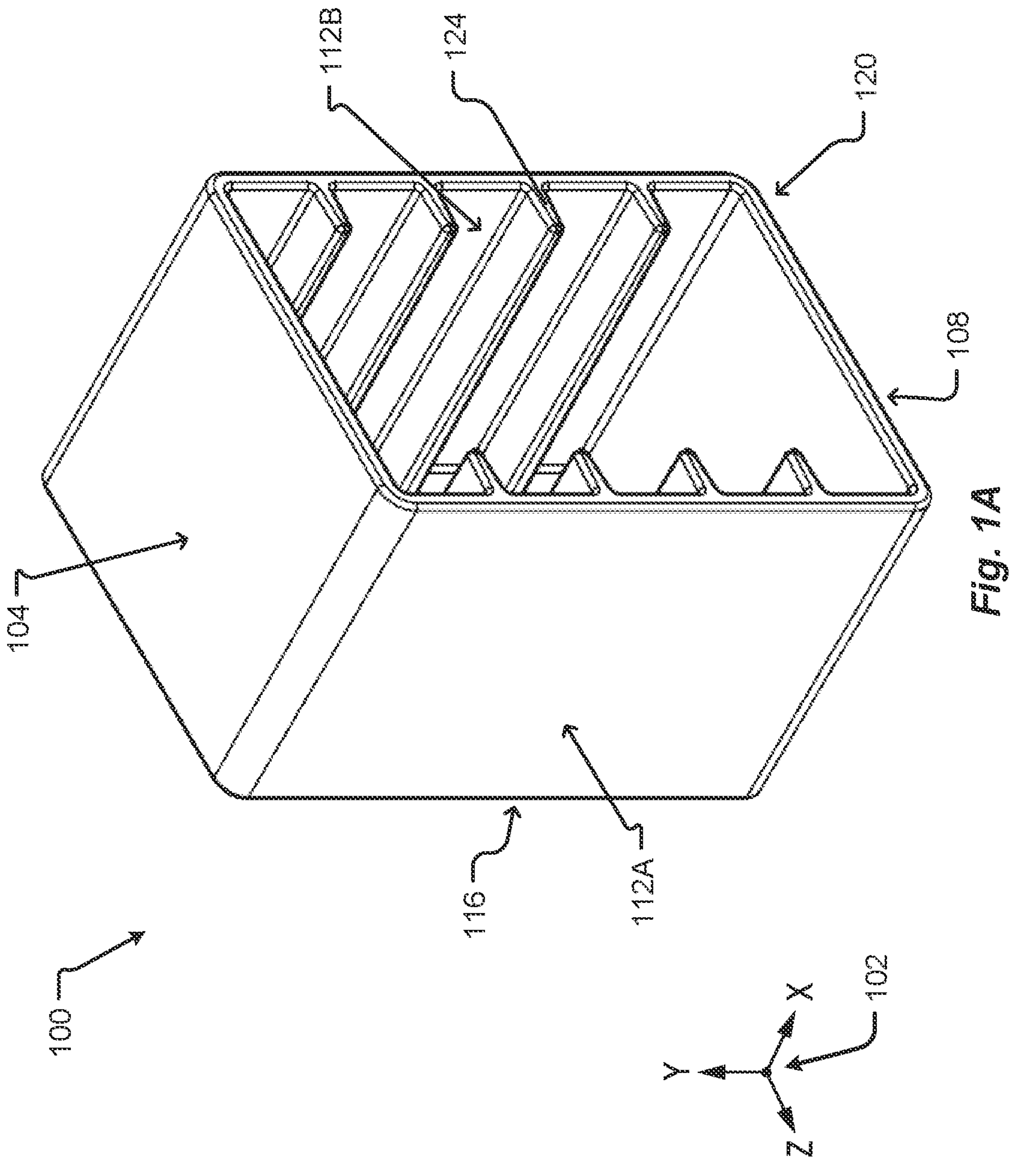
FIG. 1A shows a first view of a fuse holder in accordance with embodiments of the present disclosure.
Figure 1B:
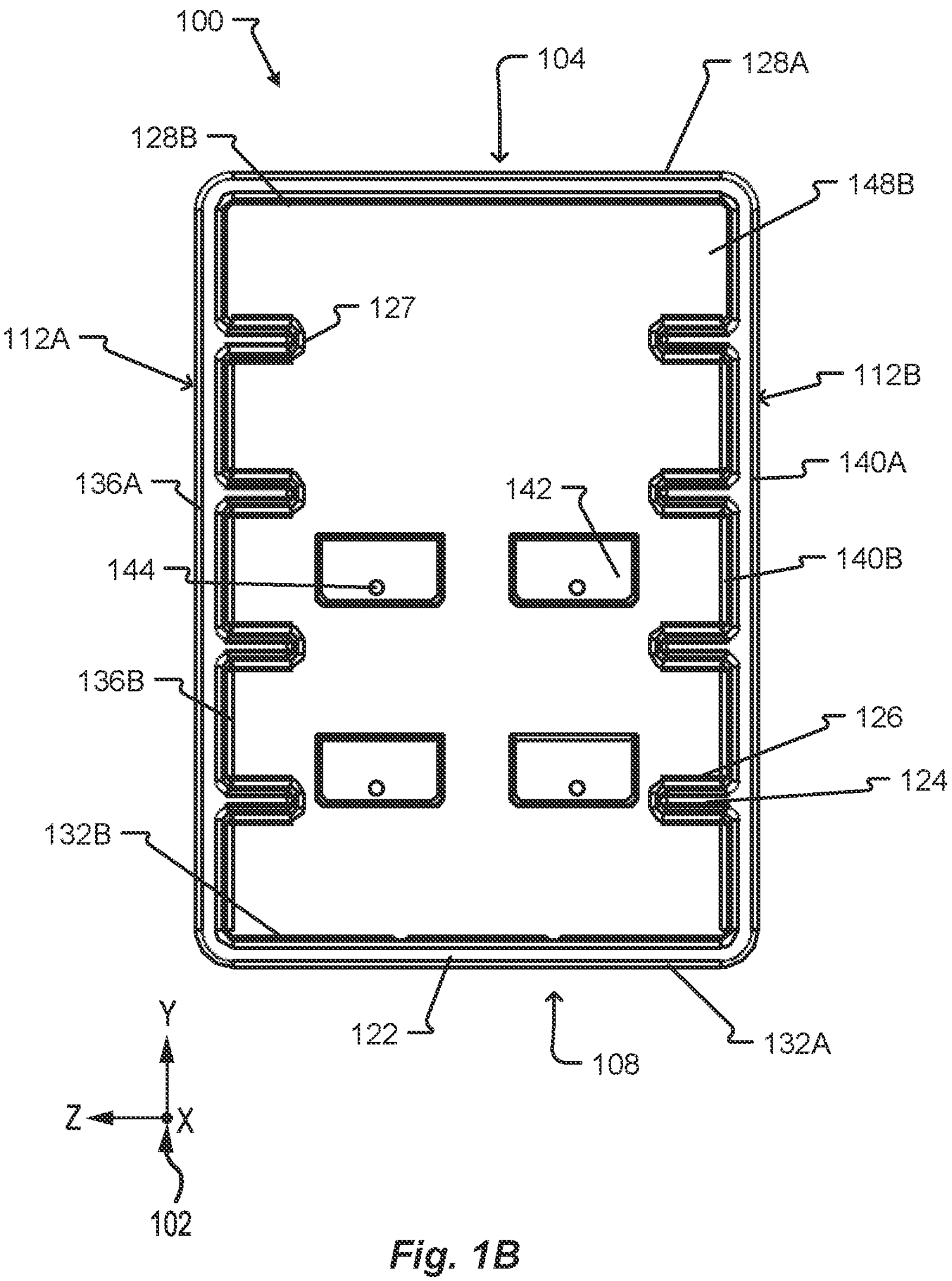
FIG. 1B shows a second view of the fuse holder in accordance with embodiments of the present disclosure.
Figure 1C:
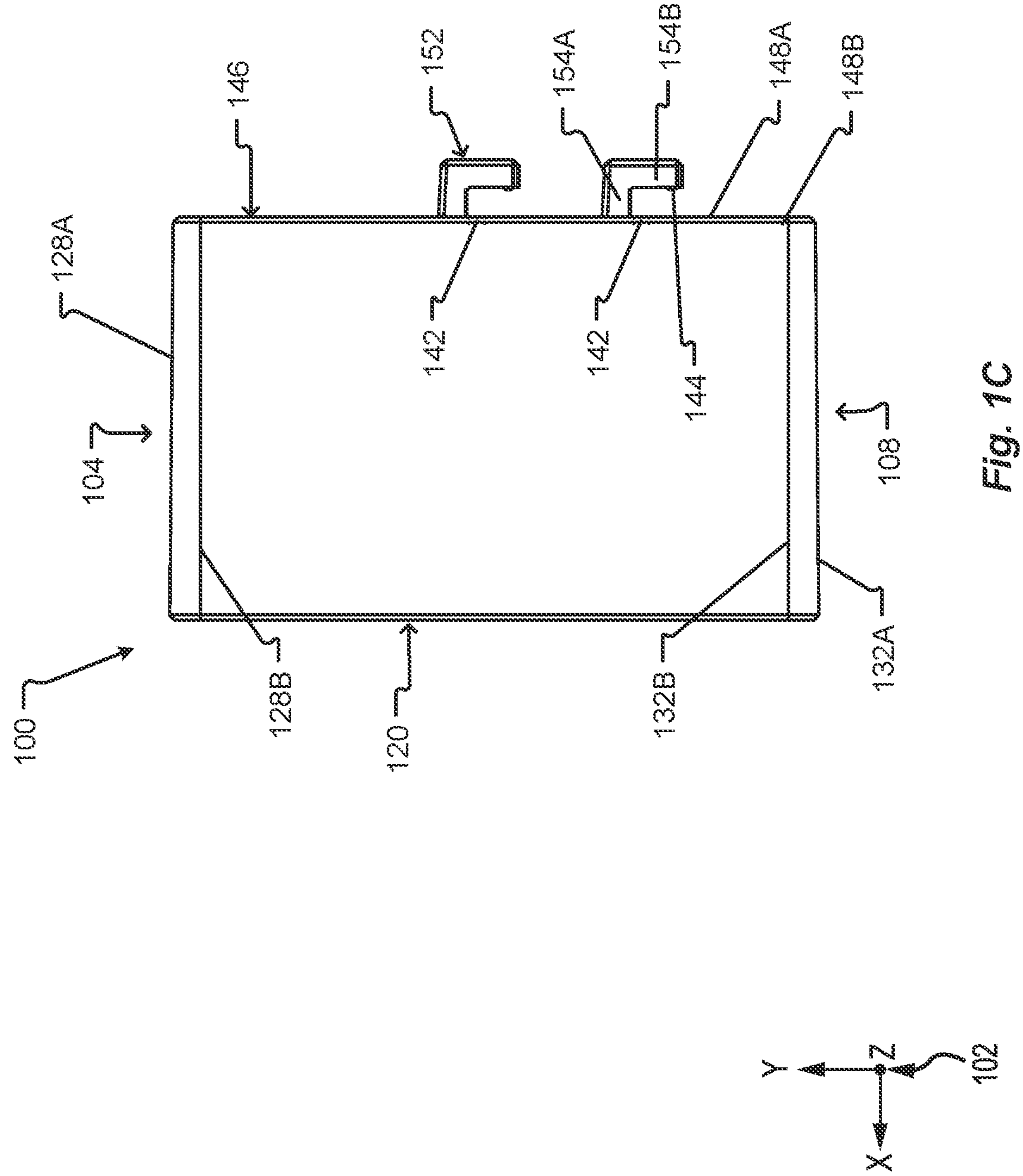
FIG. 1C shows a third view of the fuse holder in accordance with embodiments of the present disclosure.
Figure 1D:
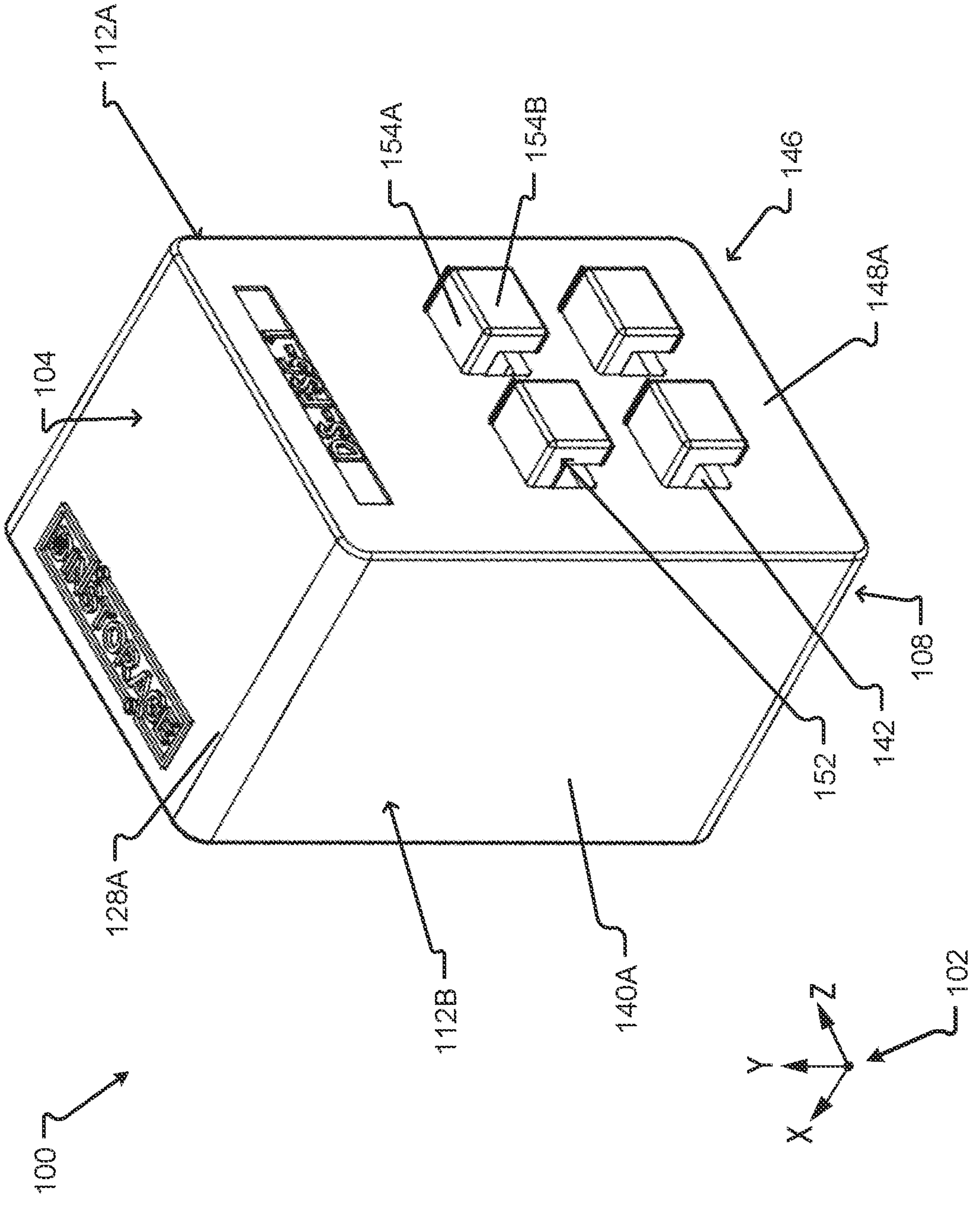
FIG. 1D shows a fourth view of the fuse holder in accordance with embodiments of the present disclosure.

In some embodiments, reference may be made to dimensions, angles, directions, related positions, and/or movements associated with one or more components of a fuse holder 100 with respect to a coordinate system 102. The coordinate system 102, as shown in the accompanying figures, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the fuse holder 100. These planes may be disposed orthogonal, or at 90 degrees, to one another. While the origin of the coordinate system 102 may be placed at any point on or near the fuse holder 100 for the purposes of description, the axes of the coordinate system 102 are always disposed along the same directions from figure to figure. As shown in FIG. 1A, the length of the fuse holder 100 may be defined as the dimension along the X-axis, the height of the fuse holder 100 may be defined as the dimension along the Y-axis, and the width of the fuse holder 100 may be defined as the dimension along the Z-axis. Additionally or alternatively, the directionality of the X-axis, Y-axis, and Z-axis may be flipped, as noted with negative directionality (i.e., the negative X-axis direction is the opposite direction of the X-axis direction). Other dimensions, angles, and relative positions of the one or more components of the fuse holder 100 may be described herein.

Turning first to FIGS. 1A-1D, various views of a fuse holder 100 is shown in accordance with at least one embodiment of the present disclosure. The fuse holder 100 extends from a top end 104 to a bottom end 108 in the Y-axis dimension. The top end 104 comprises an outer surface 128A and an inner surface 128B. The bottom end 108 similarly comprises an outer surface 132A and an inner surface 132B. The fuse holder 100 comprises a first sidewall 112A and a second sidewall 112B positioned opposite the first sidewall 112A. The first sidewall 112A comprises an outer surface 136A and an inner surface 136B and the second sidewall 112B comprises an outer surface 140A and an inner surface 140B. The first sidewall 112A and the second sidewall 112B may be positioned between and/or connect the top end 104 and the bottom end 108, and may be spaced apart from one another a first distance in the Z-axis direction. In some embodiments, the inner surfaces 136B, 140B of the first and second sidewalls 112A, 112B may each contact the top end inner surface 128B and the bottom end inner surface 132B, and the outer surfaces 136A, 140A of the first and second sidewalls 112A, 112B may each contact the top outer surface 128A and the bottom end outer surface 132A. In some embodiments, the edges at which the inner surfaces meet each other and/or where the outer surfaces meet each other may be rounded off (e.g., filleted) or chamfered.

A back end 116 of the fuse holder 100 includes a back panel 146, with the back panel 146 connecting the top end 104, the bottom end 108 and the first and second sidewalls 112A, 112B. Such connections between the back panel 146 and the ends 104, 108 and the sidewalls 112A, 112B create a 5-sided rectangular prism, with a front end 120 of the fuse holder 100 providing access to the interior of the fuse holder 100.

One or more portions of the fuse holder 100 may be made of one or more plastics (e.g., polypropylene, polyethylene, polystyrene, polyvinyl chloride, polymethyl methacrylate, etc.), other polymers (e.g., silicone), metals (e.g., steel, stainless steel, etc.), glass, combinations thereof, or the like. The fuse holder 100 (or components thereof) may be constructed or molded via injection molding, compression molding, extrusion molding, rotational molding, thermoforming, casting (e.g., into a pre-made mold), machining, and/or via any other shape-forming technique.

The fuse holder 100 also comprises one or more ledges 124. The ledges 124 may be positioned within the fuse holder 100 and extend from the first sidewall 112A toward the second sidewall 112B, and/or vice versa. In other words, the ledges 124 may extend in the Z-axis direction from a second wall inner surface 140B of the second sidewall 112B toward the first sidewall 112A (and/or similarly in the negative Z-axis from a first sidewall inner surface 136B of the first sidewall 112A toward the second sidewall 112B). Each ledge of the one or more ledges 124 may comprise a ledge surface 126 and a ledge end 127. The ledge surface 126 may provide a surface area upon which a fuse or other object can be placed. For instance, the fuse holder 100 may hold multiple containers (e.g., boxes, drawers, etc.) with each container comprising various types of fuses. The multiple containers may be rectangularly shaped (e.g., such that the containers can fit in the fuse holder 100) and may be configured to hold fuses therein. In some embodiments, the containers stored in the fuse holder 100 may house different types of fuses (e.g., fuses with different current thresholds, fuses with different breaking capacities, fuses of different physical dimensions, etc.). In some embodiments, the ledges 124 may extend entirely from the first sidewall 112A to the second sidewall 112B (and vice versa), such that the ledge surface 126 spans the entirety of the distance separating the second sidewall inner surface 140B and the first sidewall inner surface 136B. Additionally or alternatively, the ledges 124 may extend a portion or entirety of the fuse holder 100 in the X-axis direction. For example, the ledges 124 may begin at the back panel inner surface 148B and extend in the X-axis direction toward the front end 120. In some embodiments, the ledges 124 may extend to the front end surface 122, while in other embodiments the ledges 124 may stop before reaching the front end surface 122.

It is to be appreciated that the number of ledges present in the fuse holder 100 is in no way limited to the embodiments shown in the accompanying figures. For instance, the fuse holder 100 may comprise two ledges (e.g., one ledge extending from the first sidewall inner surface 136B toward the second sidewall inner surface 140B and one ledge extending from the second sidewall inner surface 140B toward the first sidewall inner surface 136B, where the two ledges are aligned in the Y-axis direction), four ledges, six ledges, eight ledges, ten ledges, twelve ledges, fourteen ledges, sixteen ledges, or eighteen ledges. The plurality of ledges 124 may span a portion or the entirety of the interior space in the Y-axis direction. In some embodiments, the plurality of ledges 124 may be evenly distributed in the Y-axis direction, such that a distance between each ledge, a distance between a ledge closest to the top end inner surface 128B and the top end inner surface 128B, and/or a distance between a ledge closest to the bottom end inner surface 132B and the bottom end inner surface 132B are equal or about equal.

The fuse holder 100 may comprise one or more holes 142 disposed in the back panel 146. In some embodiments, the holes 142 may pass through the entirety of the back panel 146 from the back panel inner surface 148B to the back panel outer surface 148A (and vice versa). The holes 142 may facilitate the connection of the fuse holder 100 to a base clip such as a base clip 300. The fuse holder 100 may also comprise one or more hooks 152. The hooks 152 may be disposed on the back panel outer surface 148A and may extend from the back panel outer surface 148A in the negative X-axis direction (i.e., away from the back panel outer surface 148A). The hooks 152 may be uniformly disposed on the back panel outer surface 148A, such that the hooks 152 are equally spaced in the Y-axis and/or the Z-axis direction. Each of the hooks 152 may comprise a horizontal portion 154A and a vertical portion 154B. The horizontal portion 154A may connect with the vertical portion 154B at a right angle (i.e., a 90 degree angle), or at an angle that is approximately 90 degrees (e.g., 85 degrees, 87 degrees, 91 degrees, 93 degrees, etc.). The horizontal portion 154A may extend from the back panel outer surface 148A away from the back panel outer surface 148A (i.e., in the negative X-axis direction). In one embodiment, the horizontal portion 154A may extend perpendicularly from the back panel outer surface 148A (i.e., a right angle may be formed between the back panel outer surface 148A and the horizontal portion 154A). In some embodiments, the angle between the back panel outer surface 148A and the horizontal portion 154A may be approximately 90 degrees (e.g., 85 degrees, 87 degrees, 89 degrees, 91 degrees, 93 degrees, 95 degrees, etc.). In some embodiments, the vertical portion 154B may extend from the horizontal portion 154A in the negative Y-axis direction. In other words, the vertical portion 154B may extend from the horizontal portion 154A toward the bottom end 108. In some embodiments, the vertical portion 154B may be perpendicular or approximately perpendicular to the horizontal portion 154A. In one embodiment, the fuse holder 100 may comprise four hooks 152, with each of the four hooks 152 comprising a horizontal portion 154A and a vertical portion 154B. In such embodiments, a hole 142 may be disposed below the horizontal portion 154A of the hook 152 (i.e., closer to the bottom end 108). In some embodiments, the horizontal portion 154A may extend from the back panel outer surface 148A such that there may be a space between the back panel outer surface 148A and the vertical portion 154B. The hook 152 may also comprise a protrusion 144. The protrusion 144 may be disposed on the vertical portion 154B and may extend from the vertical portion 154B in the X-axis direction (i.e., toward the back panel outer surface 148A). The protrusion 144 may assist or facilitate the connection of the fuse holder 100 with the base clip 300, as described in further detail below. For instance, the protrusion 144 may increase the contact surface area between the fuse holder 100 and the base clip 300 when the two are coupled. In some embodiments, the protrusion 144 may facilitate or assist in the attachment of the fuse holder 100 and the base clip 300 by engaging with indentations 356 disposed on the base clip 300.

FIGS. 2A-2D illustrate a fuse holder 200 in accordance with at least one embodiment of the present disclosure. The fuse holder 200 may comprise and span from a top end 204 to a bottom end 208 in the Y-axis direction. Similarly to the fuse holder 100, the top end 204 may comprise a top end outer surface 228A and a top end inner surface 228B, while the bottom end 208 may comprise a bottom end outer surface 232A and a bottom end inner surface 232B. The fuse holder 200 may also comprise a first sidewall 212A and a second sidewall 212B. The first sidewall 212A and the second sidewall 212B may be disposed between the top end 204 and the bottom end 208 and may be spaced apart a first distance in the Z-axis direction. The first sidewall 212A may comprise a first sidewall outer surface 236A and a first sidewall inner surface 236B, and the second sidewall 212B may comprise a second sidewall outer surface 240A and a second sidewall inner surface 240B. The fuse holder 200 may also comprise a back panel 246 that contacts and connects the top end 204, the bottom end 208, the first sidewall 212A, and the second sidewall 212B together.

The fuse holder 200 may comprise one or more ledges 224. In some embodiments, the ledges 224 may be similar to or the same as the ledges 124. The ledges 224 may comprise a ledge surface 226 and a ledge end 227. In one embodiment, the fuse holder 200 may comprise two ledges positioned equidistant from the top end 204 and the bottom end 208. The fuse holder 200 may comprise one or more fuse walls 217. The one or more fuse walls 217 may facilitate the storage of, for example, fuses or other objects within the fuse holder 200. For instance, the one or more fuse walls 217 may secure a container or other storage compartment (which may contain one or more fuses) within the fuse holder 200 by preventing the container from moving in the X-axis direction when the container is positioned on the ledge surface 226. The one or more fuse walls 217 may comprise a first wall 218 and a second wall 219. The first wall 218 may extend from the first sidewall 212A, the second sidewall 212B, and/or a front end surface 222 in the X-axis direction (i.e., toward a front end 220 of the fuse holder 200). The length of the first wall 218 in the X-axis direction may vary by embodiment. For instance, the first wall 218 may be longer to fit different lengths of the objects (e.g., fuse containers, other storage containers, drawers, etc.) stored in the fuse holder 200. The second wall 219 may extend perpendicularly from an end of the first wall 218 in the Z-axis direction (or the negative Z-axis direction). The second wall 219 may provide a structure to prevent the movement of a fuse stored in the fuse holder 200 from moving in the X-axis direction.

Figure 2A:
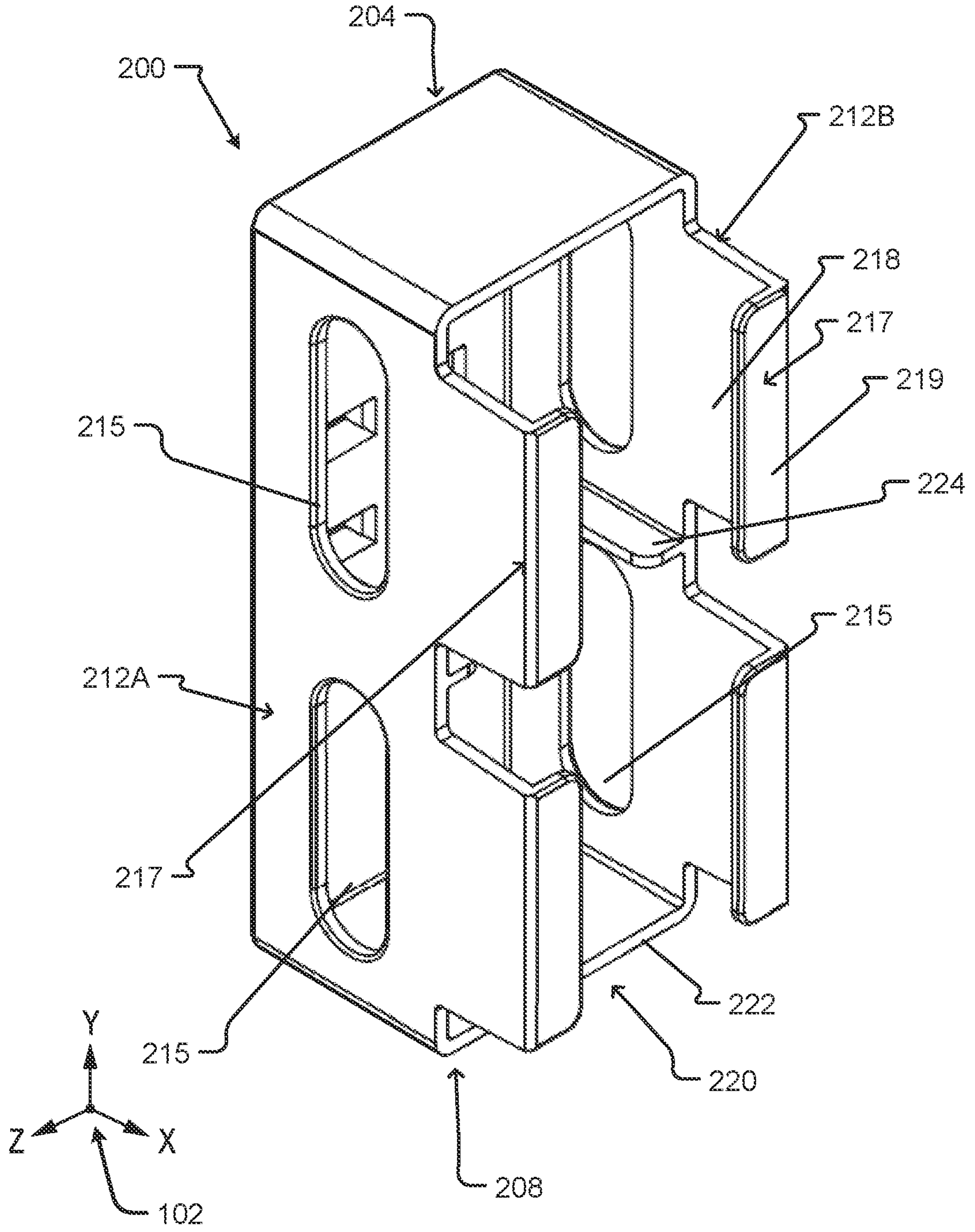
FIG. 2A shows a first view of a fuse holder in accordance with embodiments of the present disclosure.
Figure 2B:
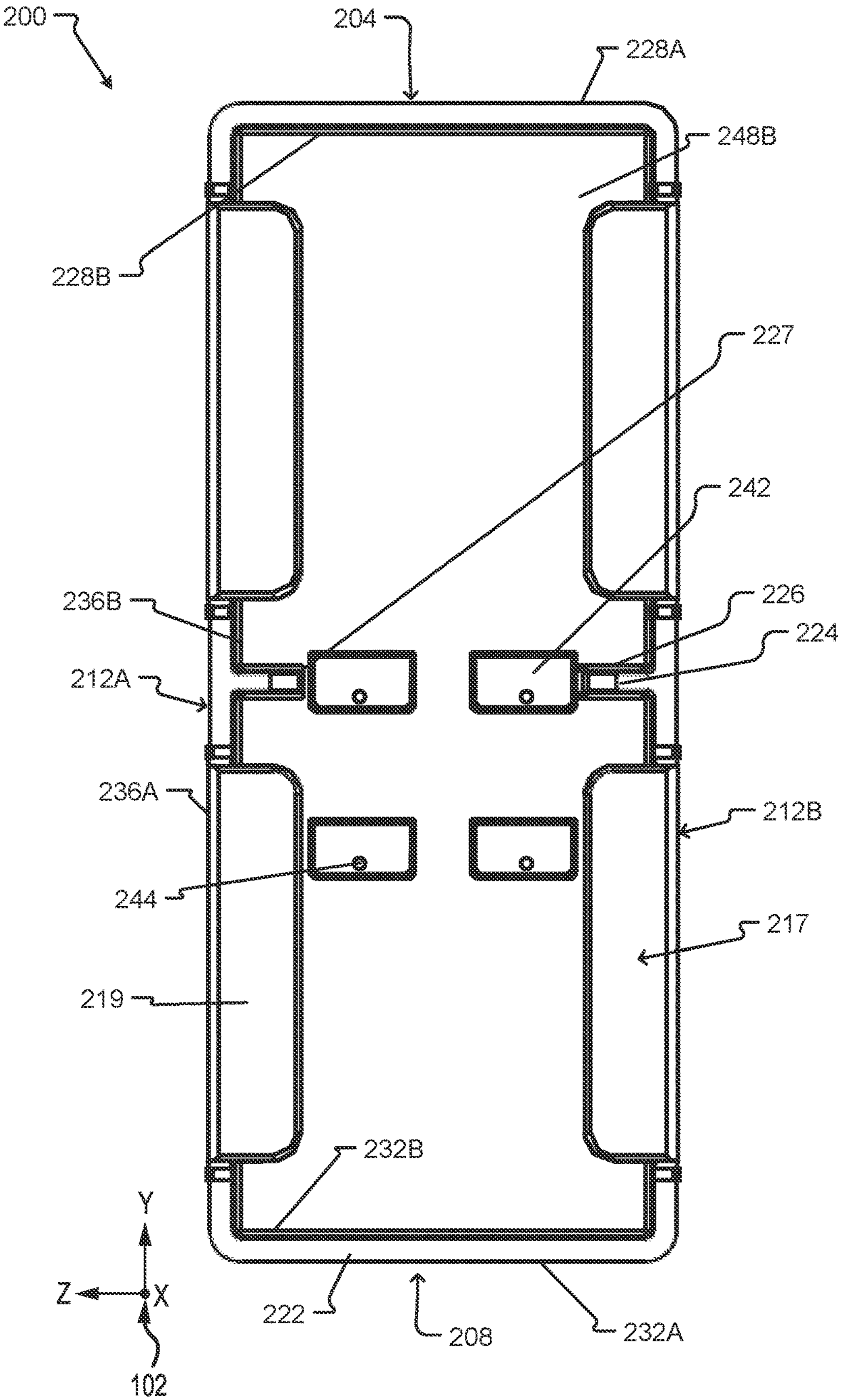
FIG. 2B shows a second view of a fuse holder in accordance with embodiments of the present disclosure.

In some embodiments, the second wall 219 may span a portion or the entirety of the distance between the first sidewall 212A and the second sidewall 212B. In some embodiments, the first wall 218 may expand one or more portions of the first sidewall 212A and/or the second sidewall 212B, such that fuses may be inserted or slid into the fuse holder 200 as well as removed from the fuse holder 200 while also preventing the fuses in the fuse holder 200 from moving in the X-axis direction (e.g., sliding out of the fuse holder 200). For example, as shown in the embodiment of FIG. 2A, the fuse walls 217 may be disposed on the first sidewall 212A and the second sidewall 212B between the top end 204 and the bottom end 208, such that fuses can be inserted between the top end 204 and the top of the fuse wall 217 and may move in the negative Y-axis direction until the fuse contacts the ledge 224. The fuse may then rest on the ledge 224 and may be prevented from moving in the X-axis direction by the second wall 219. In this example, the fuse may be removed by moving the fuse along the Y-axis direction until the fuse clears the second wall 219, then moving the fuse in the X-axis direction to remove the fuse from the fuse holder 200. The fuse holder 200 may comprise one or more slots 215. The slots 215 may be disposed in the first sidewall 212A and/or the second sidewall 212B and may facilitate with the additional and/or removal of the fuses from the fuse holder 200. In some embodiments, the slots 215 may span a portion or entirety of the first sidewall 212A and/or the second sidewall 212B. The slots 215 may permit access to the fuses in the fuse holder 200, allowing the fuses to be more easily removed from or added to the fuse holder 200.

The fuse holder 200 may comprise one or more holes 242 disposed in the back panel 246. In some embodiments, the one or more holes 242 and the back panel 246 may be similar to or the same as the one or more holes 142 and the back panel 146. The one or more holes 242 may pass through the back panel 246 from a back panel outer surface 248A to a back panel inner surface 248B (and vice versa), such that an interior of the fuse holder 200 is accessible through the holes 242. In some embodiments, the one or more holes 242 may be similar to or the same as the one or more holes 142.

Figure 2C:
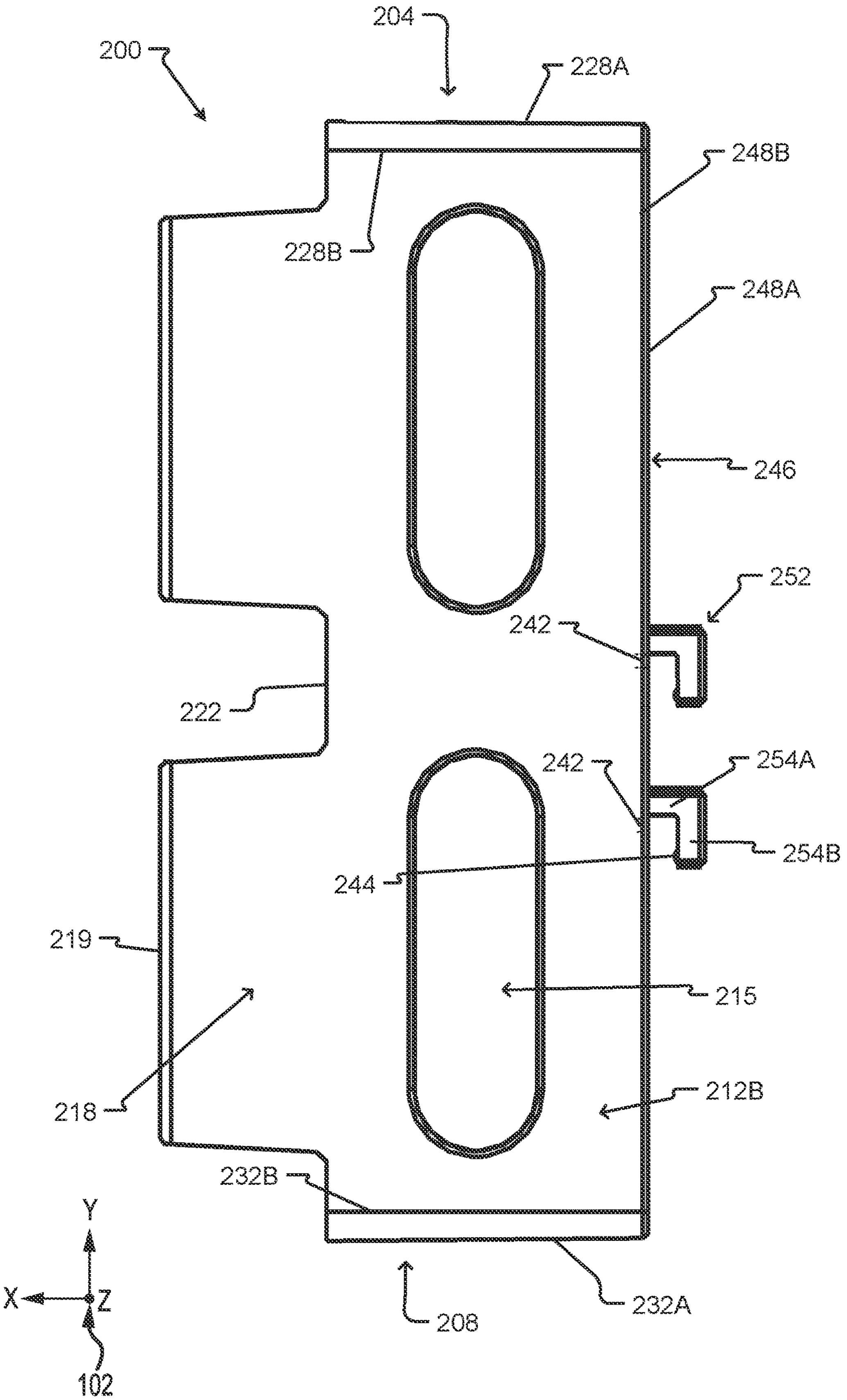
FIG. 2C shows a third view of a fuse holder in accordance with embodiments of the present disclosure.
Figure 2D:
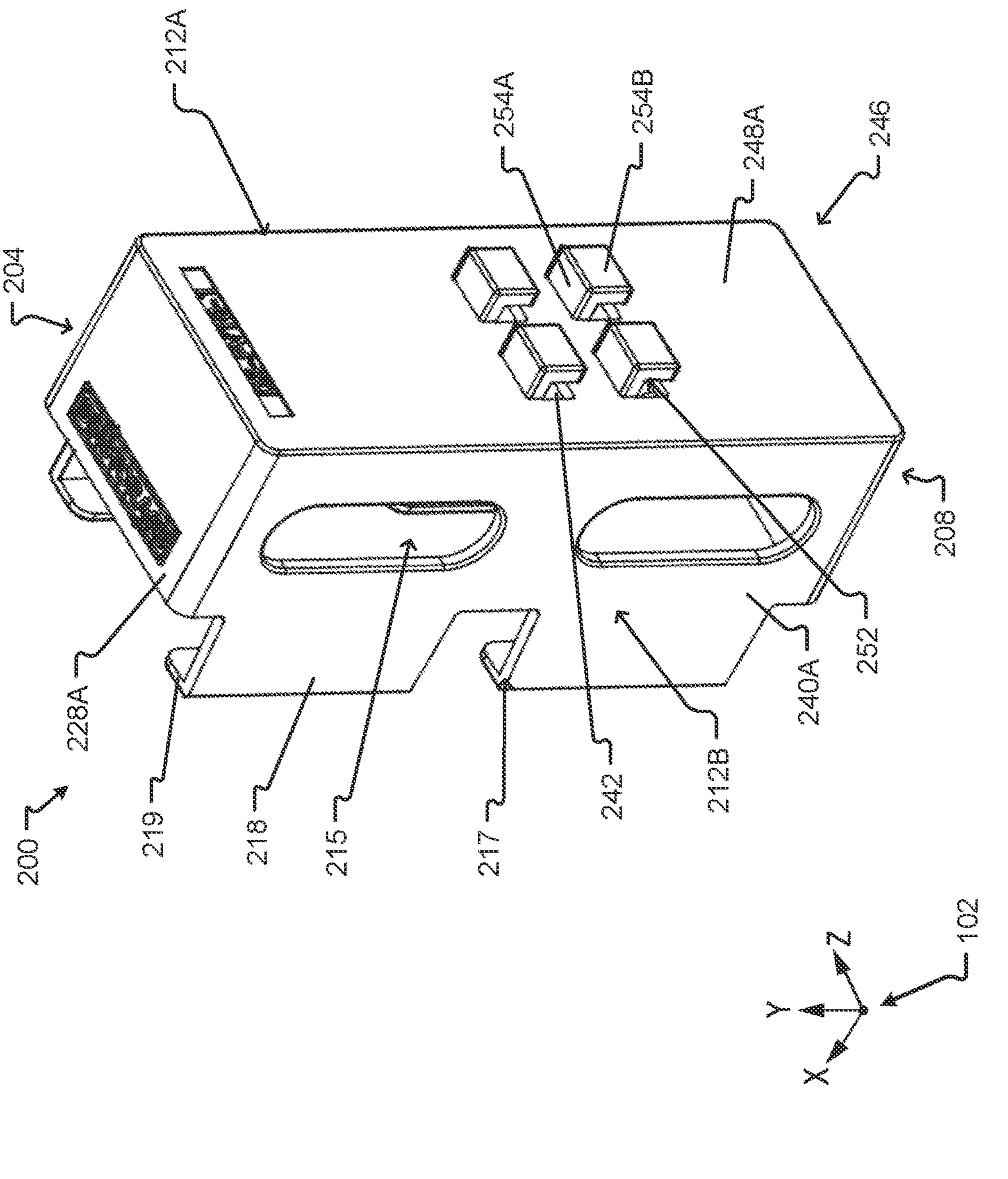
FIG. 2D shows a fourth view of a fuse holder in accordance with embodiments of the present disclosure.

The fuse holder 200 may comprise one or more hooks 252. The hooks 252 may be similar to or the same as the hooks 152. The one or more hooks 252 may each comprise a horizontal portion 254A and a vertical portion 254B. The horizontal portion 254A may extend from the back panel outer surface 248A in the negative X-axis direction (i.e., away from the back panel outer surface 248A). The vertical portion 254B may extend from the horizontal portion 254A in the negative Y-axis direction. As shown in FIG. 2C, the vertical portion 254B may extend from a first end of the horizontal portion 254A at a right angle (i.e., 90 degrees), such that the vertical portion 254B is positioned a first distance from the back panel outer surface 248A. The hooks 252 may additionally comprise a protrusion 244. In some embodiments, the protrusion 244 may be similar to or the same as the protrusion 144. The protrusion 244 may be disposed on the vertical portion 254B and may extend in the X-axis direction (i.e., toward the back panel outer surface 248A). The protrusion 244 may facilitate the connection of the fuse holder 200 with a base clip 300 by, for example, interfacing with one or more components of the base clip 300. In one embodiment, the protrusion 244 may contact indentations 356 disposed on the base clip 300, which may hold the fuse holder 200 and the base clip 300 together.

Figure 3A:
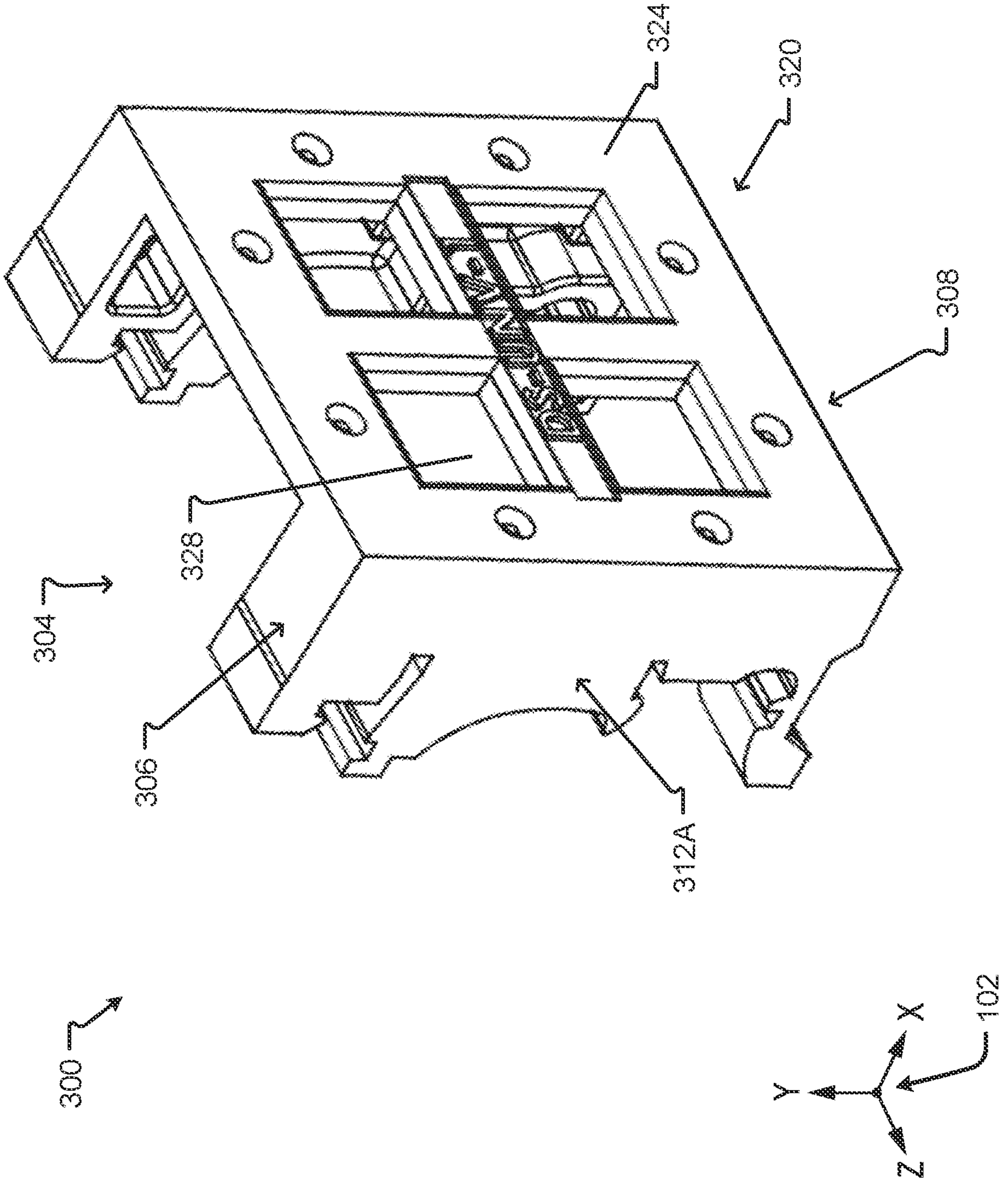
FIG. 3A shows a first view of a base clip in accordance with embodiments of the present disclosure.
Figure 3B:
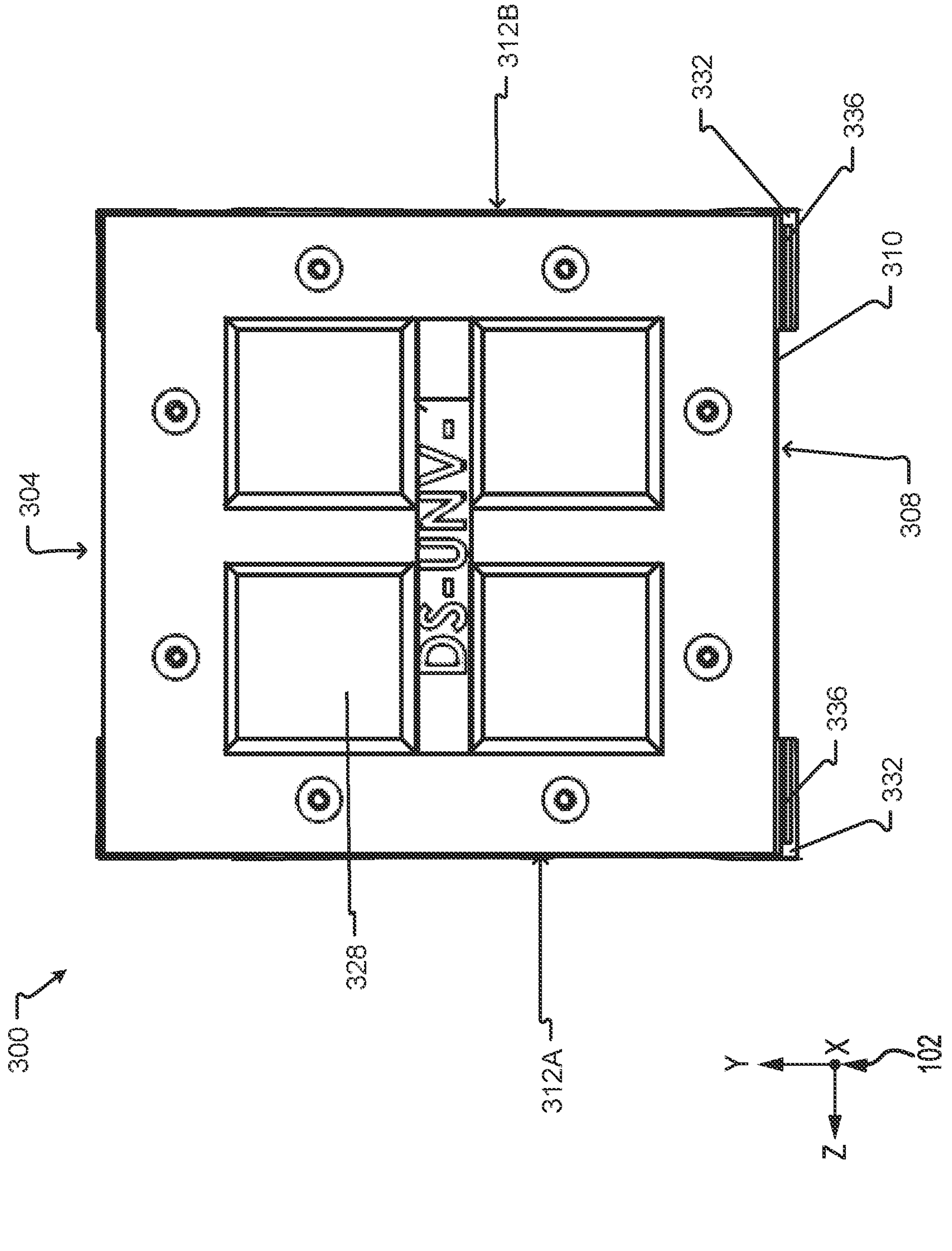
FIG. 3B shows a second view of a base clip in accordance with embodiments of the present disclosure.
Figure 3C:
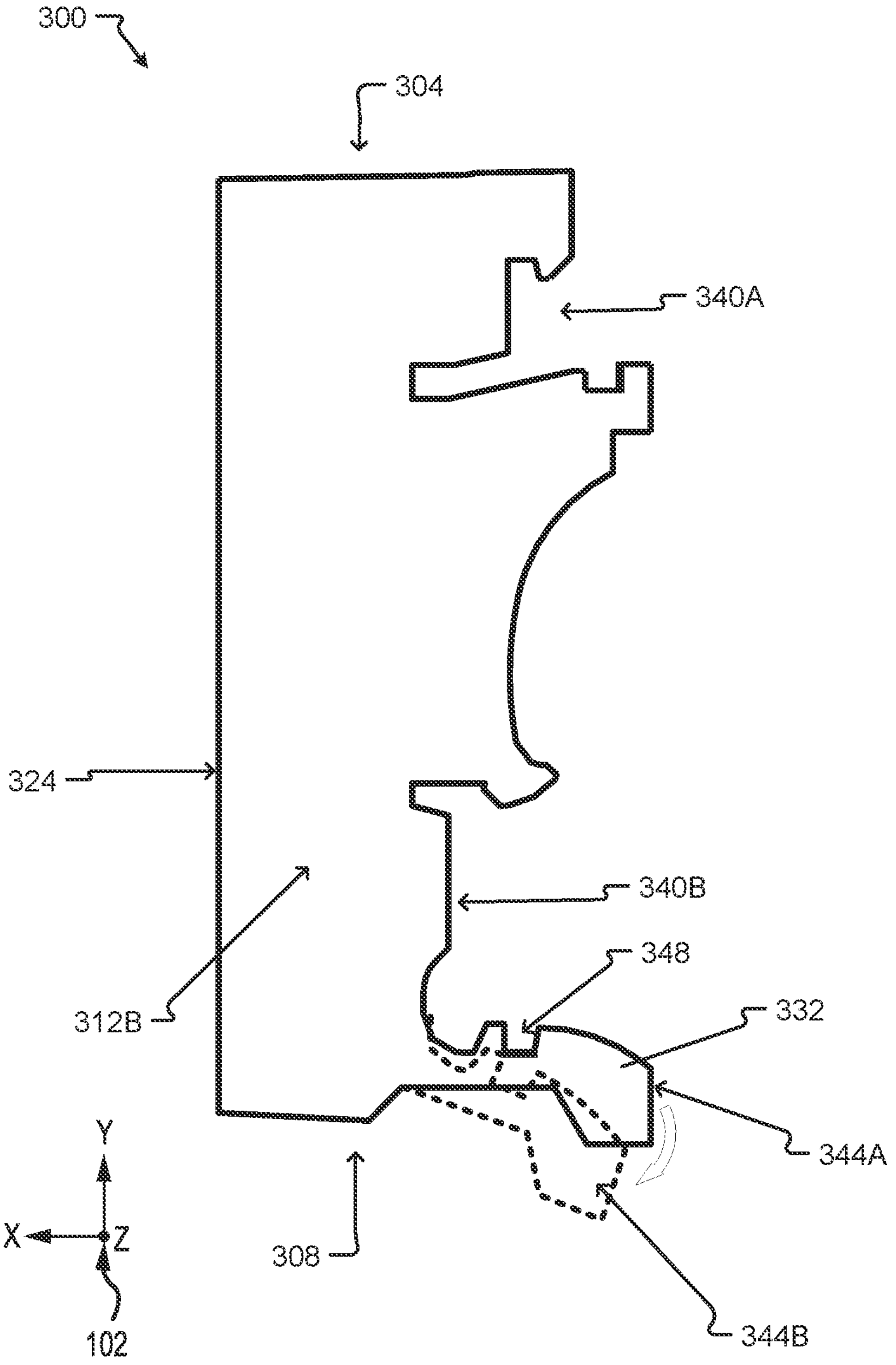
FIG. 3C shows a third view of a base clip in accordance with embodiments of the present disclosure.

FIGS. 3A-3G show a base clip 300 in accordance with embodiments of the present disclosure. The base clip 300 may extend from a top end 304 to a bottom end 308 in the Y-axis direction, from a first sidewall 312A to a second sidewall 312B in the Z-axis direction, and from a back end to a front end 320 in the X-axis direction. The top end 304 may comprise a top end outer surface 306 and the bottom end 308 may comprise a bottom end outer surface 310, both of which may contact one or more surfaces of a storage unit into which the base clip 300 may be inserted (e.g., a fuse box). The base clip 300 may comprise one or more holes 328. The one or more holes 328 may be disposed in a front end surface 324 of the base clip 300 and may extend through the front end surface 324 to a front inner surface 352. The one or more holes 328 may receive an attachment mechanism of a fuse holder (e.g., the hooks 152 of the fuse holder 100, the hooks 252 of the fuse holder 200, etc.) to couple the fuse holder and the base clip 300. The coupling may permit the fuse holder to be stored or attached to a rail or other object, such as a rail in a fuse box (e.g., a DIN rail) by connecting the base clip 300 to the rail or other object. The one or more holes 328 may match or correspond to the number of hooks 152, 252 present in the fuse holder 100, 200, or any other fuse holder mentioned herein. As shown in FIG. 3B, the base clip 300 may comprise four holes 328 arranged in a square formation, which may match the number and position of the hooks 152, 252, such that each of the hooks 152, 252 can pass through the respective hole 328 to connect the fuse holder 100, 200 to the base clip 300.

Figure 3D:
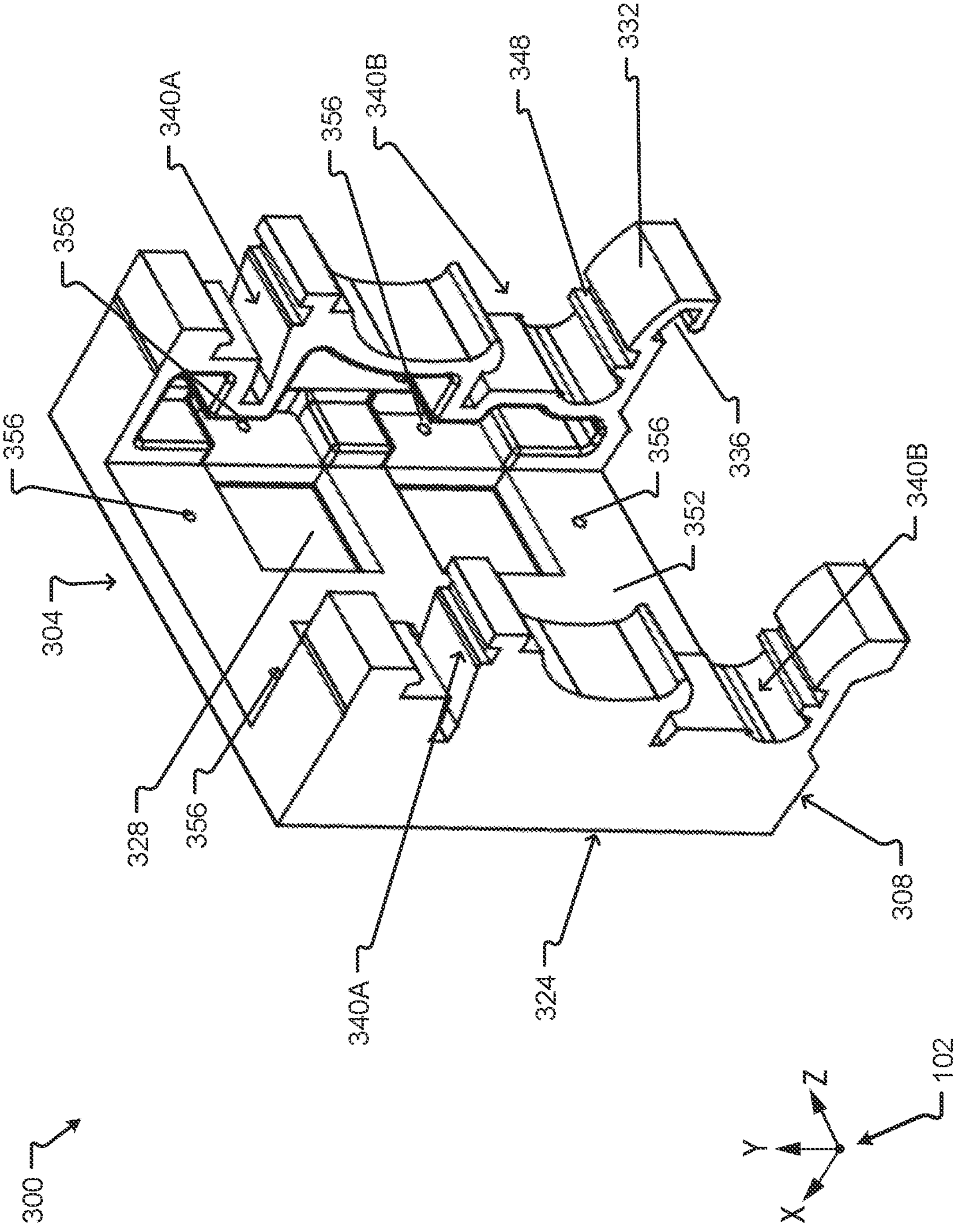
FIG. 3D shows a fourth view of a base clip in accordance with embodiments of the present disclosure.
Figure 3E:
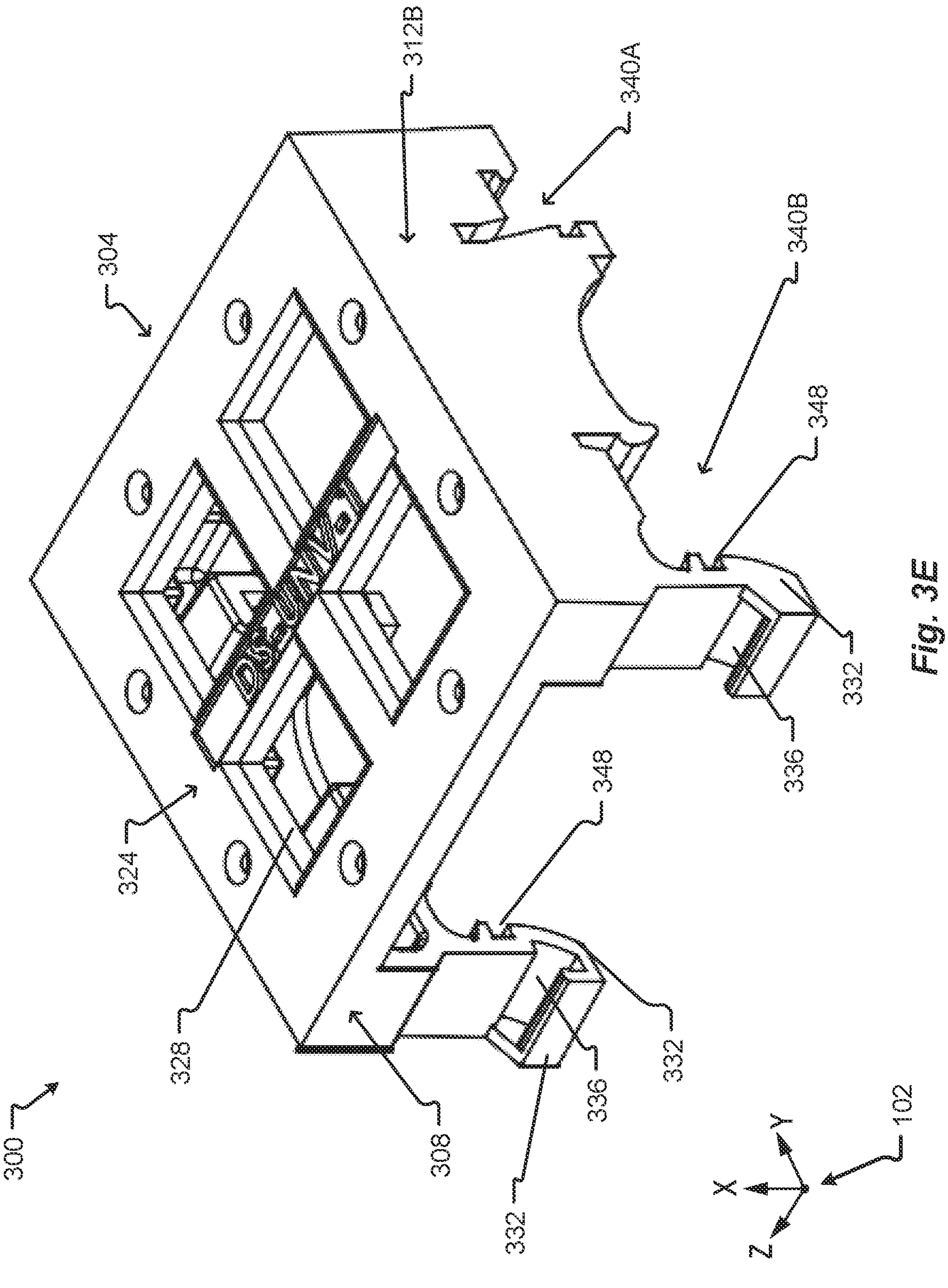
FIG. 3E shows a fifth view of a base clip in accordance with embodiments of the present disclosure.

The base clip 300 may comprise a plurality of indentations 356. The indentations 356 may be disposed proximate to each of the one or more holes 328 and may facilitate the connection of the base clip 300 with a fuse holder (e.g., fuse holder 100, fuse holder 200, other fuse holders mentioned herein, etc.). For instance, the indentations 356 may be concave portions that receive the protrusions 144, 244 as the fuse holder 100, 200 moves to engage the base clip 300. The insertion of the indentations 356 into the protrusions 144, 244 may create or increase surface area for frictional force between the fuse holder 100 or the fuse holder 200 and the base clip 300, increasing the effectiveness of the coupling between the fuse holder 100 or the fuse holder 200 and the base clip 300. In some embodiments, the indentations 356 may be disposed along the perimeter of the base clip 300 at evenly spaced intervals as shown in FIG. 3D, such that the base clip 300 may be rotated in 90 degree intervals (i.e., rotated 90 degrees, rotated 180 degrees, or rotated 270 degrees) and still be configured to connect to the fuse holder 100 or the fuse holder 200.

The first sidewall 312A and the second sidewall 312B may comprise first concave portions 340A and second concave portions 340B. The first concave portions 340A may be configured to receive a convex protrusion (e.g., a DIN rail in a fuse box) and/or wrap around the convex protrusion. For instance, the first concave portions 340A may be made of one or more plastics (e.g., polypropylene, polyethylene, polystyrene, polyvinyl chloride, polymethyl methacrylate, etc.) that may be flexible enough to bend or stretch around the convex protrusion as the convex protrusion enters the first concave portions 340A. The second concave portions 340B may comprise a flexible member 332. The flexible member 332 may be made of a flexible material (e.g., a plastic) that permits the flexible member 332 to move from a first position 344A to a second position 344B. When in the first position 344A, the flexible member 332 may allow the second concave portions 340B to connect with or attach to a convex protrusion or other object (e.g., a portion of a DIN rail in a fuse box). The flexible member 332 may be transitioned from the first position 344A to the second position 344B to remove the base clip 300 from the object to which the base clip 300 is attached (e.g., a rail, a DIN rail, a portion of a fuse box, etc.). In at least one embodiment, the base clip 300 may comprise a disconnection slot 336. The disconnection slot 336 may facilitate the disconnection of the base clip 300 from the object by receiving a tool tip (e.g., an end of a slotted screwdriver). The tool tip may then be twisted, rotated, or otherwise moved to apply a rotational force to the flexible member 332 to move the flexible member 332 from the first position 344A to the second position 344B, allowing the base clip 300 to be removed from the object.

The flexible member 332 may comprise a securing slot 348. The securing slot 348 may be disposed proximate the second concave portion 340B and may extend across a portion or the entirety of a width of the flexible member 332. The securing slot 348 may provide a location for a portion of an object to which the base clip 300 attaches (e.g., a portion of a rail, a portion of a fastener of a fuse box, etc.) to interface with the base clip 300. In some embodiments, the dimensions of the securing slot 348 (e.g., the length of the securing slot 348 in the X-axis direction, the width of the securing slot 348 in the Z-axis direction, and/or the depth of the securing slot 348 in the Y-axis direction) may be manufactured or formed based on, for example, the dimensions of the object to which the base clip 300 is configured to attach.

Figure 3F:
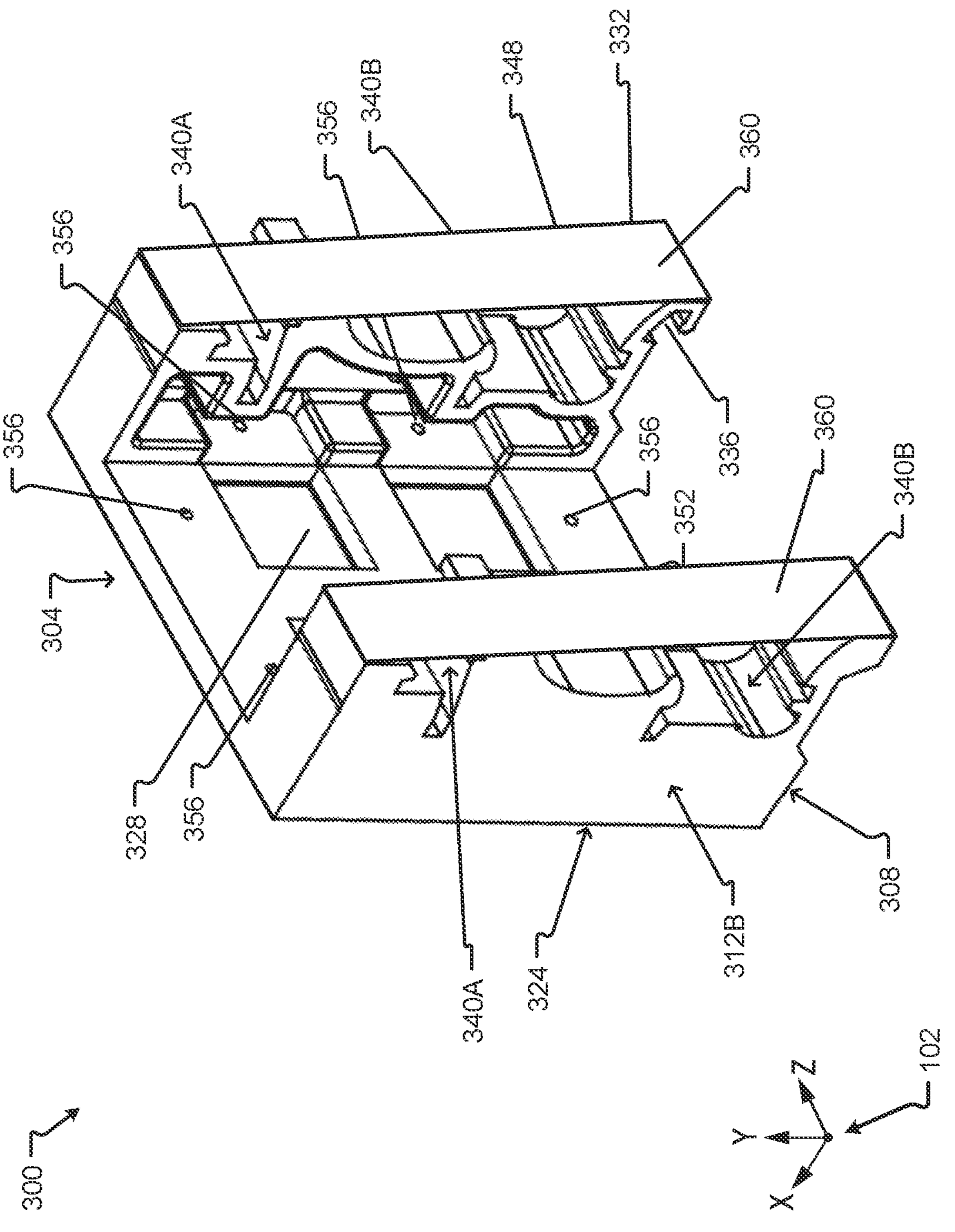
FIG. 3F shows a view of a second base clip in accordance with embodiments of the present disclosure.
Figure 3G:
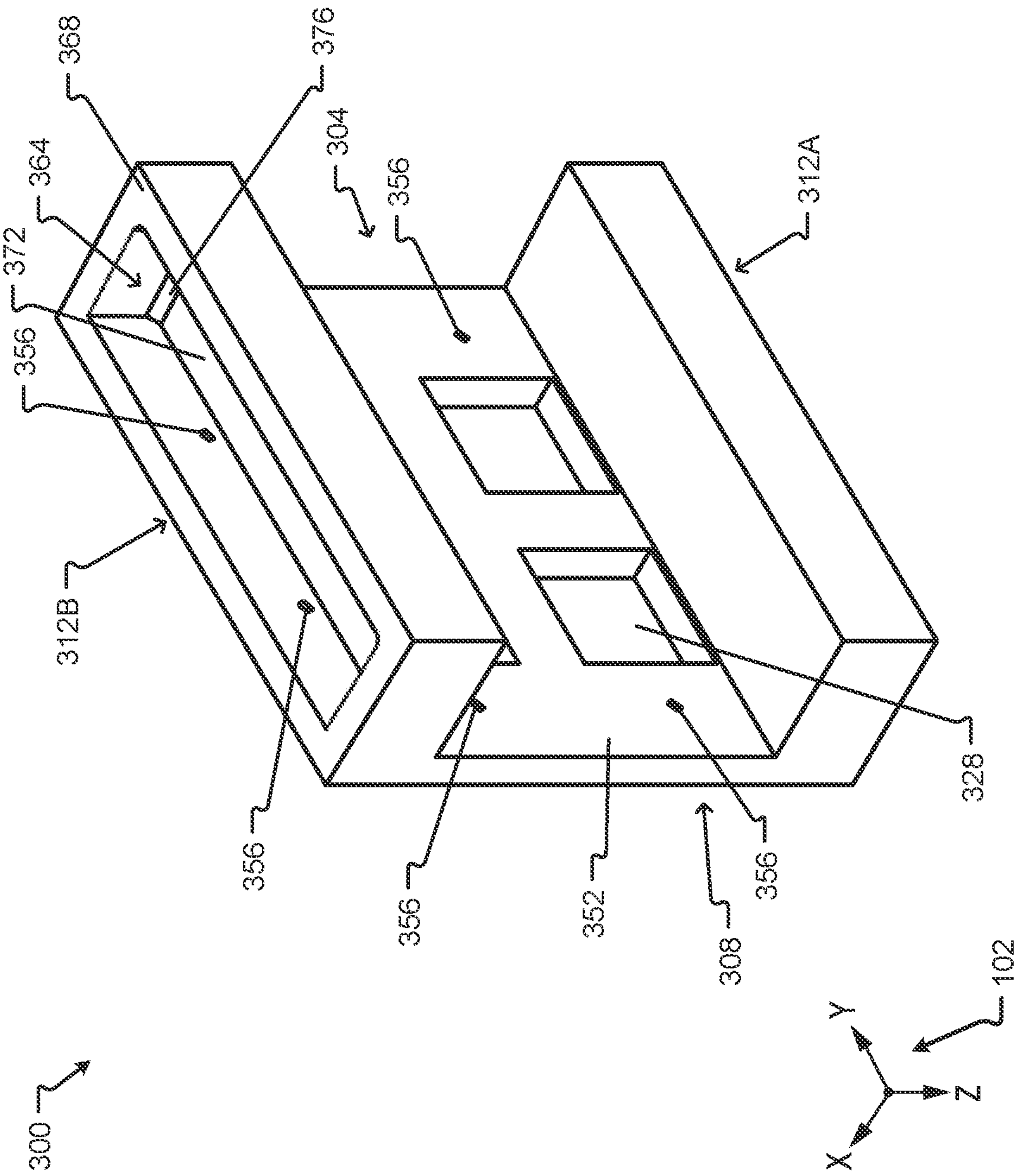
FIG. 3G shows a view of a third base clip in accordance with embodiments of the present disclosure.

In some embodiments, the base clip 300 may comprise one or more backplates 360. The backplates 360 may expand from the bottom end 308 to the top end 304 and may contact one or more components of the base clip 300. As depicted in FIG. 3F, the backplates 360 may be affixed or attached to the flexible members 332 and run along the Y-axis direction to the top end 304 of the base clip 300. In such embodiments, the backplates 360 may partially or completely cover the first concave portions 340A and second concave portions 340B and may additionally or alternatively replace the first concave portions 340A and the second concave portions 340B as the mechanism to attach the base clip 300 to an object (e.g., a portion of a fuse box). In some embodiments, the backplates 360 may be integrated into the base clip 300 (i.e., the backplates 360 are formed from the same piece as the base clip 300). In other embodiments, the backplates 360 may be detachable or removable from the base clip 300. In some embodiments, the backplates 360 may be or comprise adhesive tape, adhesive magnetic tape, combinations thereof, or the like to facilitate the connection between the base clip 300 and the object. For instance, the backplates 360 may comprise peel-and-press tape, allowing the base clip 300 to be attached to a fuse box wall (where surfaces or ledges used by the first concave portions 340A and the second concave portions 340B are inaccessible or not otherwise available).

In some embodiments, the base clip 300 may comprise one or more hollow portions 364. The hollow portions 364 may be disposed in one or both of the first and second sidewalls 312A, 312B. The hollow portion 364 may extend into the one or both of the first and second sidewalls 312A, 312B from a sidewall outer surface 368 to a sidewall inner surface 372, creating a hollow portion that may interface with one or more elements of an object (e.g., a fuse box, components and/or portions of the fuse box, etc.). In some embodiments, the hollow portions 364 may comprise one or more fillets 376 at the base of the sidewall inner surface 372. The fillets 376 may assist with attaching the base clip 300 to objects with rounded edges that occupy the hollow portion 364 when coupled with the base clip 300 by beneficially enabling greater surface area contact between the object with rounded edges and the sidewall inner surface 372.

In some embodiments, the hollow portion 364 may comprise one or more indentations 356. The indentations 356 may, as previously noted, facilitate or assist with the connection of the base clip 300 to an object (e.g., portions of the fuse box). The one or more indentations 356 may be disposed in a pattern (e.g., equally spaced, in an array, offset from one another by a predetermined distance, combinations thereof, and/or the like). The hollow portion 364 may be formed from first and second sidewalls 312A, 312B that are rectangularly shaped (e.g., the contours of the sidewalls meet at right angles, as depicted in, for example, FIG. 3G), permitting the base clip 300 to be mounted to a flat surface. The rectangular shape of the first and second sidewalls 312A, 312B may beneficially enable the base clip 300 to better attach to flat surfaces by increasing the surface area contact between one or both of the first and second sidewalls 312A, 312B and the flat surface to which the base clip 300 is mounted.

FIGS. 4A-4D illustrate a storage container 400 in accordance with embodiments of the present disclosure. The storage container 400 may be used to hold, for example, tools (e.g., screwdrivers, flashlights, wire cutters, pliers, etc.), consumables (e.g., screws, zip ties, batteries, wiring, etc.), and/or one or more fuses (or other fuse-related objects). The storage container 400 may span from a back end 416 to a front end 420 in the X-axis direction, span from a first sidewall outer surface 436A to a second sidewall outer surface 440A in the Z-axis direction, and from a bottom end outer surface 432A to a top end outer surface 428A in the Y-axis direction. The storage container 400 extends from a top end 404 to a bottom end 408 in the Y-axis direction and extends from a first sidewall 412A to a second sidewall 412B in the Z-axis direction. The storage container 400 may comprise one or more ledges 424, which may be similar to or the same as other ledges discussed herein (e.g., ledges 124, ledges 224, etc.). In some embodiments, the ledges 424 may extend from both a first sidewall inner surface 436B and a second sidewall inner surface 440B toward the middle of the storage container 400 (i.e., in the negative Z-axis and positive Z-axis directions, respectively). In one embodiment, the one or more ledges 424 may extend along a portion of the storage container 400 in the X-axis direction. For instance, the one or more ledges 424 may start at a back panel inner surface 448B and run along the X-axis direction toward a front end 420 but may not extend to a front end surface 422 (i.e., the one or more ledges 424 may stop before reaching the front end surface 422). In some embodiments, the one or more ledges 424 may comprise a ledge surface 426 that may provide a surface upon which an object (e.g., a fuse container) may rest. In some embodiments, the ledge surfaces 426 may be used to hold drawers (not shown) within the interior of the storage container 400. For example, in the embodiment shown in FIG. 4A, two drawers may be stored in the storage container 400: one drawer resting on the ledge surface 426, and another drawer resting on a bottom end inner surface 432B. The drawers may be configured to slide along the ledge surface 426 and the bottom end inner surface 432B, respectively, in the X-axis direction. The one or more ledges 424 may also extend from one of a first sidewall 412A or a second sidewall 412B to a ledge end 427, where the ledge end 427 defines the end of the ledge 424.

The storage container 400 may comprise one or more ledge slots 418. Each ledge slot 418 may be a slot, groove, or channel that runs from the back panel 446 along a portion of one of the first sidewall 412A or second sidewall 412B toward the front end 420 (i.e., along the X-axis direction). The ledge slot 418 may assist with connecting or engaging the storage container 400 to one or more objects (e.g., to DIN rails in a fuse box). Additionally or alternatively, the storage container 400 may comprise one or more cylindrical slots 458. The cylindrical slots 458 may be disposed partially in the top end outer surface 428A, the top end inner surface 428B, and/or the back panel 446 and extend along a portion of the storage container 400 in the X-axis direction (i.e., toward the front end 420). In some embodiments, the cylindrical slots 458 may not extend the entirety of the length of the storage container 400 in the X-axis direction (i.e., the cylindrical slots 458 may end before the cylindrical slots 458 reach the front end surface 422). In some embodiments, the cylindrical slots 458 may be tapered. For instance, the cylindrical slots 458 may begin with a first height in the Y-axis direction at the back panel 446 but may narrow to a second height smaller than the first height along the X-axis direction, such that the end of the cylindrical slots 458 closer to the front end 420 has the second height. In some embodiments, the second height may be greater than or equal to the first height. Additionally or alternatively, the width of the cylindrical slots 458 in the Z-axis direction may be tapered as the cylindrical slots 458 move along the X-axis direction, such that the cylindrical slots 458 has a first width at a first end closer to the back panel 446 and a second width at a second end closer to the front end 420, with the second width being smaller than the first width. In some embodiments, the second width may be greater than or equal to the first width.

The storage container 400 may comprise one or more holes 442 disposed in the back panel 446. In some embodiments, the one or more holes 442 and the back panel 446 may be similar to or the same as the one or more holes 142 and the back panel 146. The one or more holes 442 may pass through the back panel 446 from a back panel outer surface 448A to a back panel inner surface 448B (or vice versa), such that an interior of the storage container 400 is accessible through the holes 442. In some embodiments, the one or more holes 442 may be similar to or the same as the one or more holes 142.

Figure 4A:
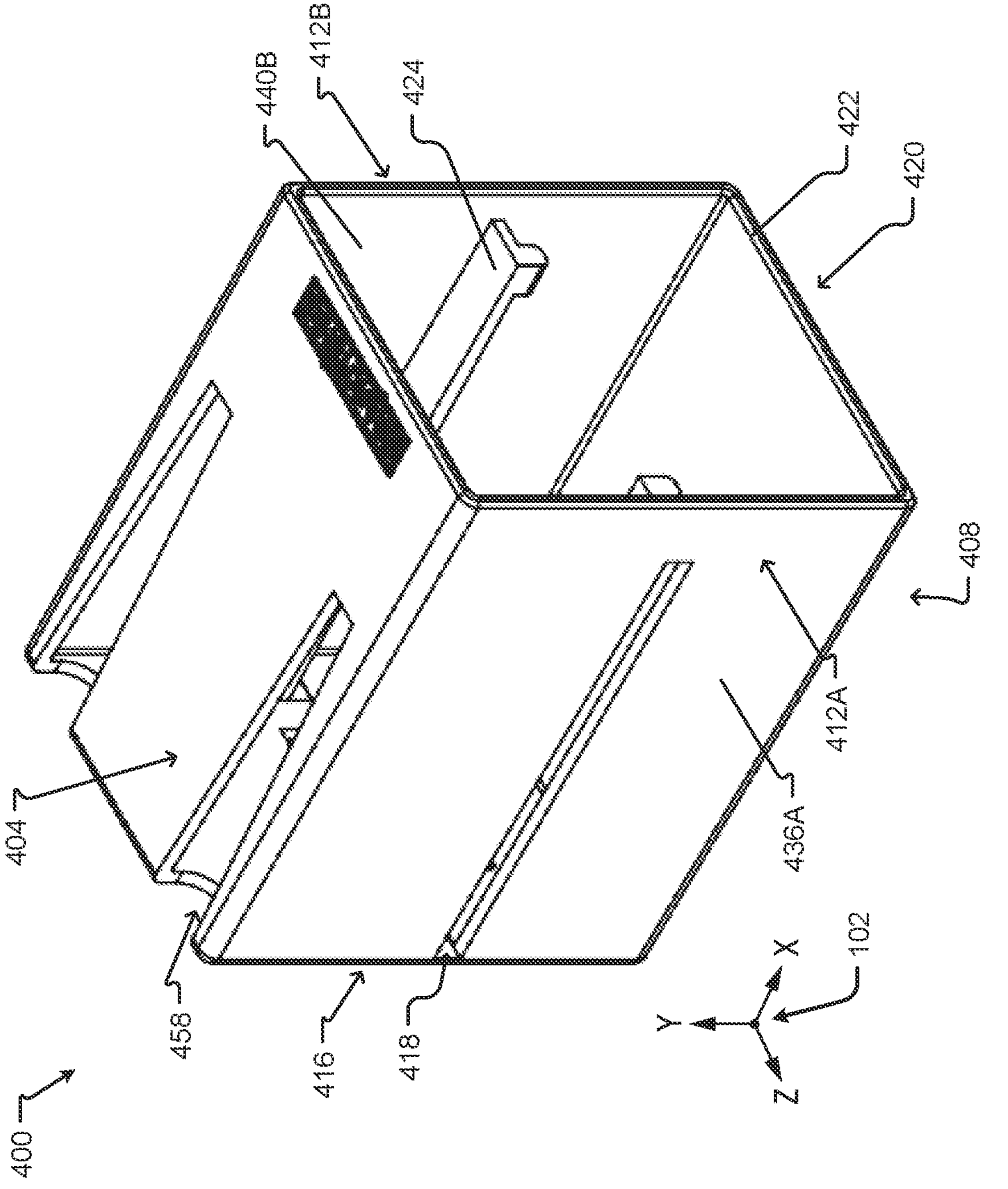
FIG. 4A shows a first view of a fuse holder in accordance with embodiments of the present disclosure.
Figure 4B:
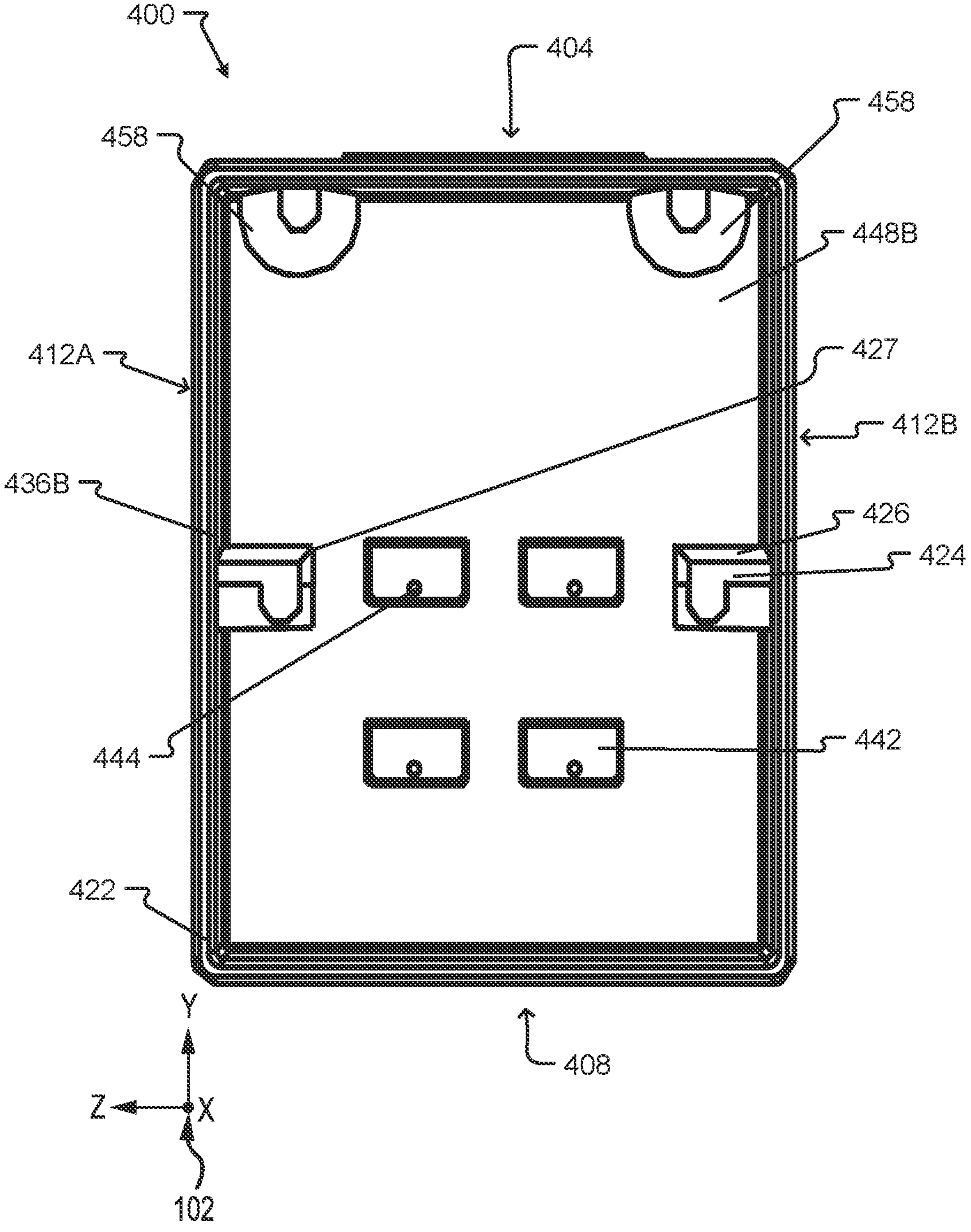
FIG. 4B shows a second view of a fuse holder in accordance with embodiments of the present disclosure.
Figure 4C:
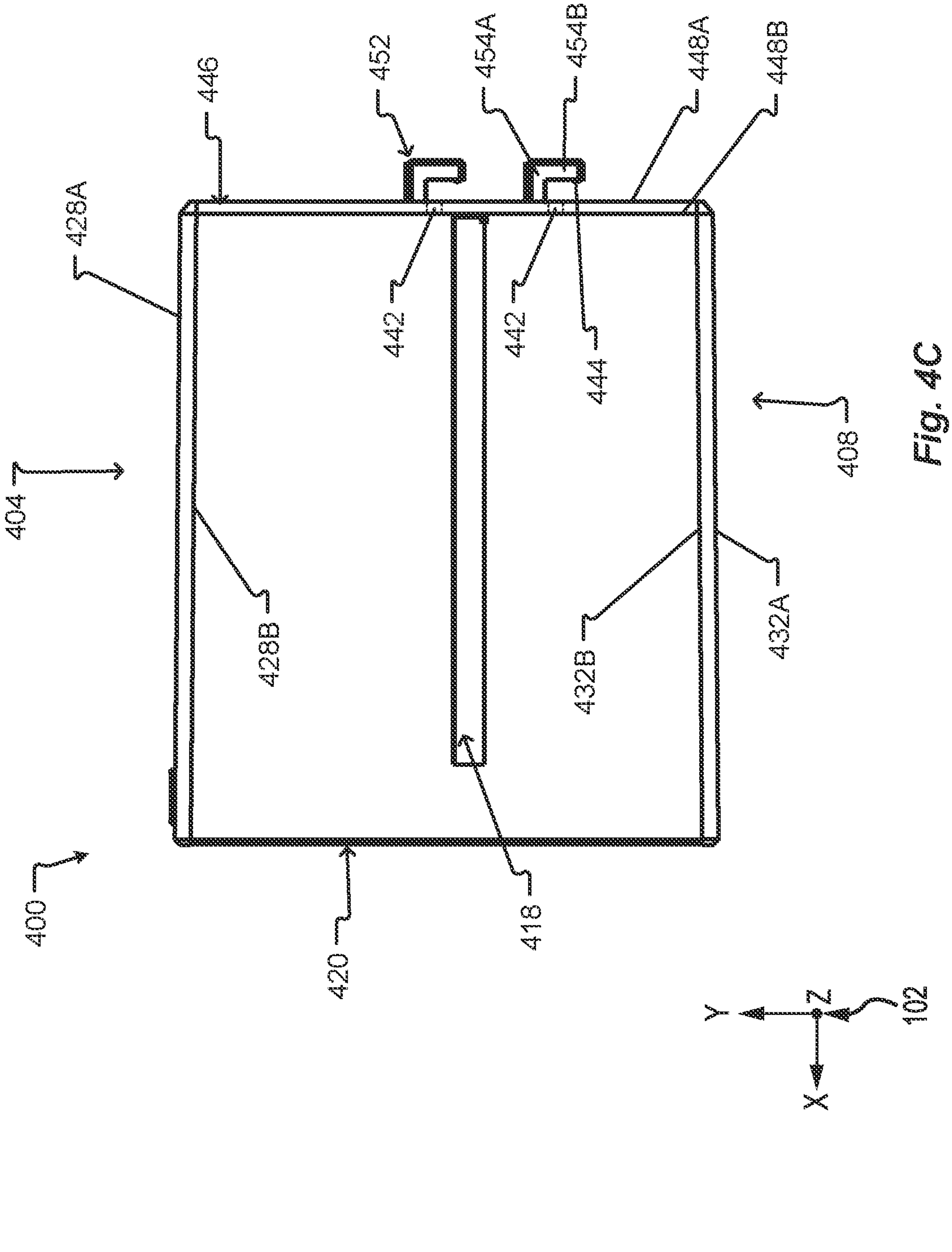
FIG. 4C shows a third view of a fuse holder in accordance with embodiments of the present disclosure.
Figure 4D:
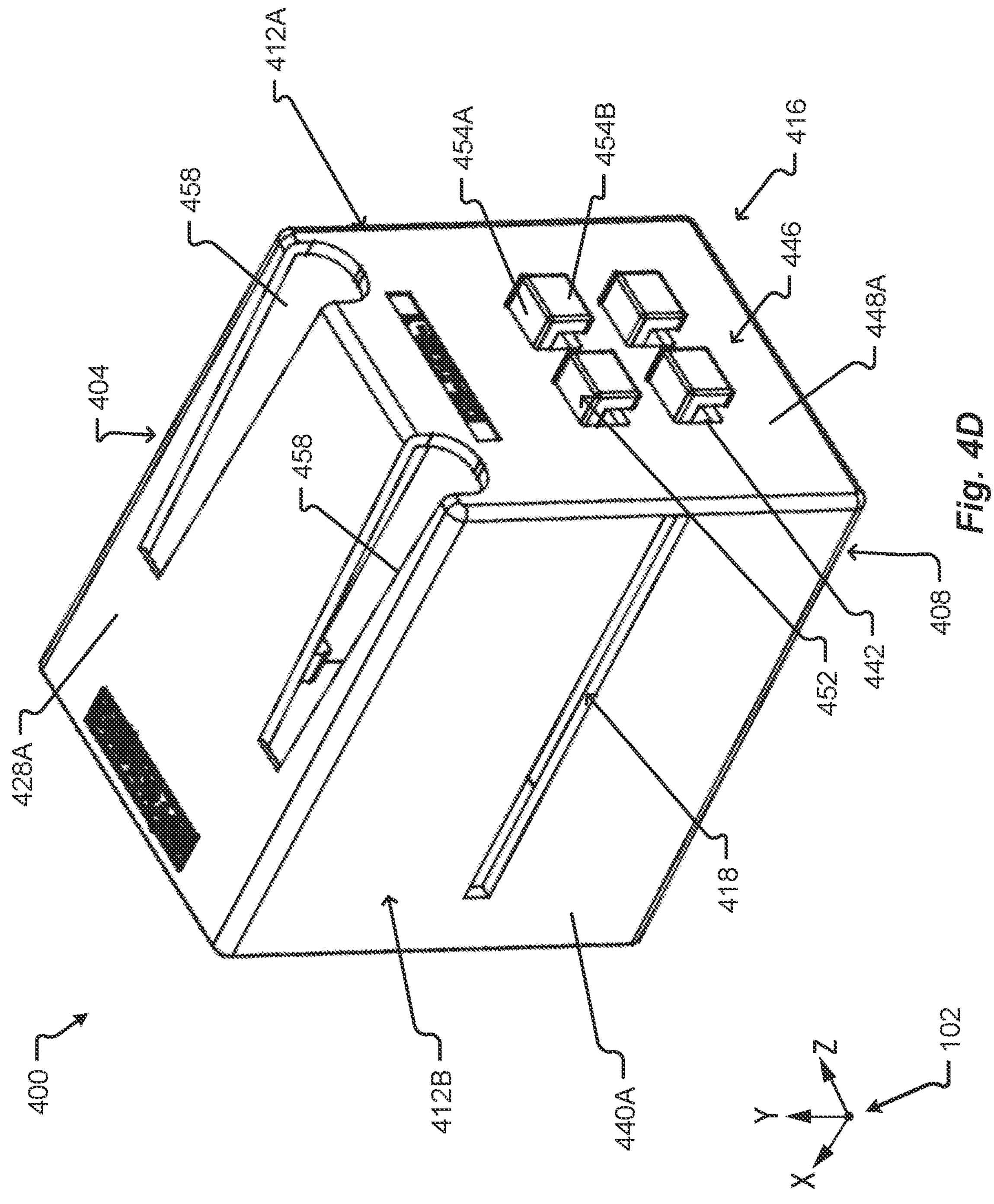
FIG. 4D shows a fourth view of a fuse holder in accordance with embodiments of the present disclosure.

The storage container 400 may comprise one or more hooks 452. The hooks 452 may be similar to or the same as the hooks 152. The one or more hooks 452 may each comprise a horizontal portion 454A and a vertical portion 454B. The horizontal portion 454A may extend from the back panel outer surface 448A in the negative X-axis direction (i.e., away from the back panel outer surface 448A). The vertical portion 454B may extend from the horizontal portion 454A in the negative Y-axis direction. As shown in FIG. 4C, the vertical portion 454B may extend from a first end of the horizontal portion 454A at a right angle (i.e., 90 degrees), such that the vertical portion 454B is positioned a first distance from the back panel outer surface 448A. The hooks 452 may additionally comprise a protrusion 444. In some embodiments, the protrusion 444 may be similar to or the same as the protrusion 144. The protrusion 444 may be disposed on the vertical portion 454B and may extend in the X-axis direction (i.e., toward the back panel outer surface 448A). The protrusion 444 may facilitate the connection of the storage container 400 with a base clip 300 by, for example, interfacing with one or more components of the base clip 300. In one embodiment, the protrusion 444 may contact indentations 356 disposed on the base clip 300, which may hold the storage container 400 and the base clip 300 together.

Figure 5B:
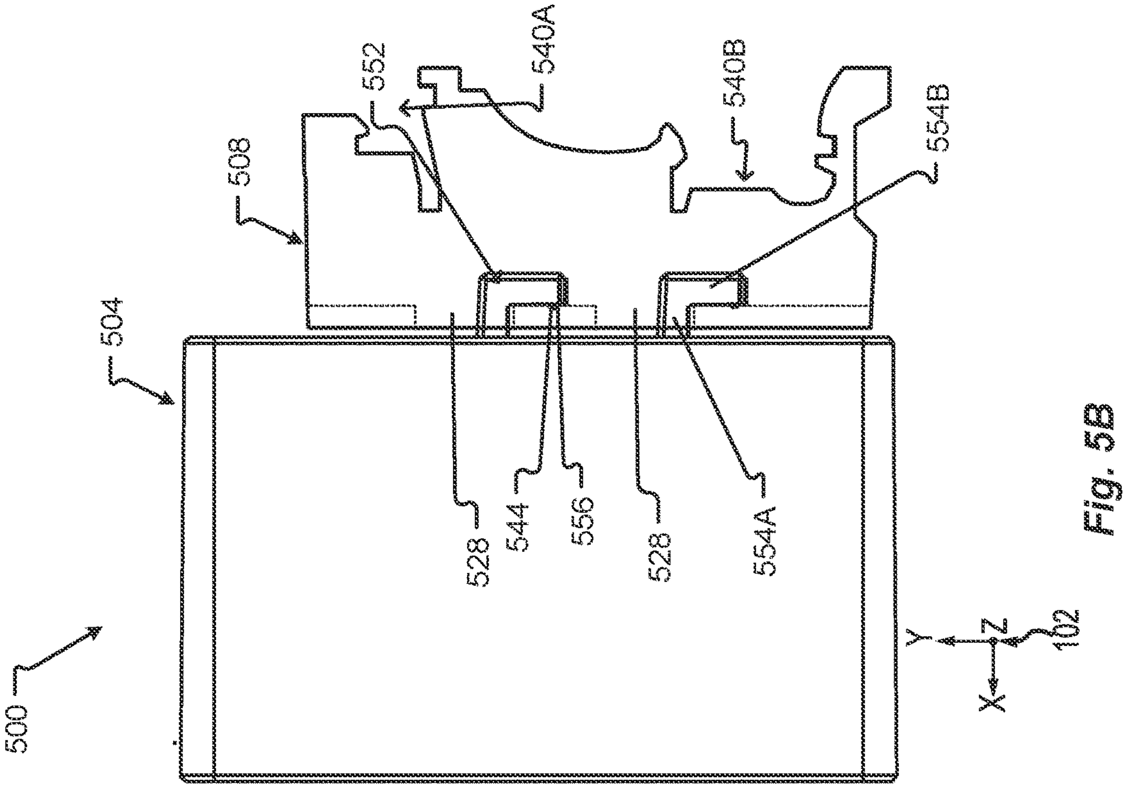
FIG. 5B shows the assembly in a second orientation in accordance with embodiments of the present disclosure.
Figure 5A:
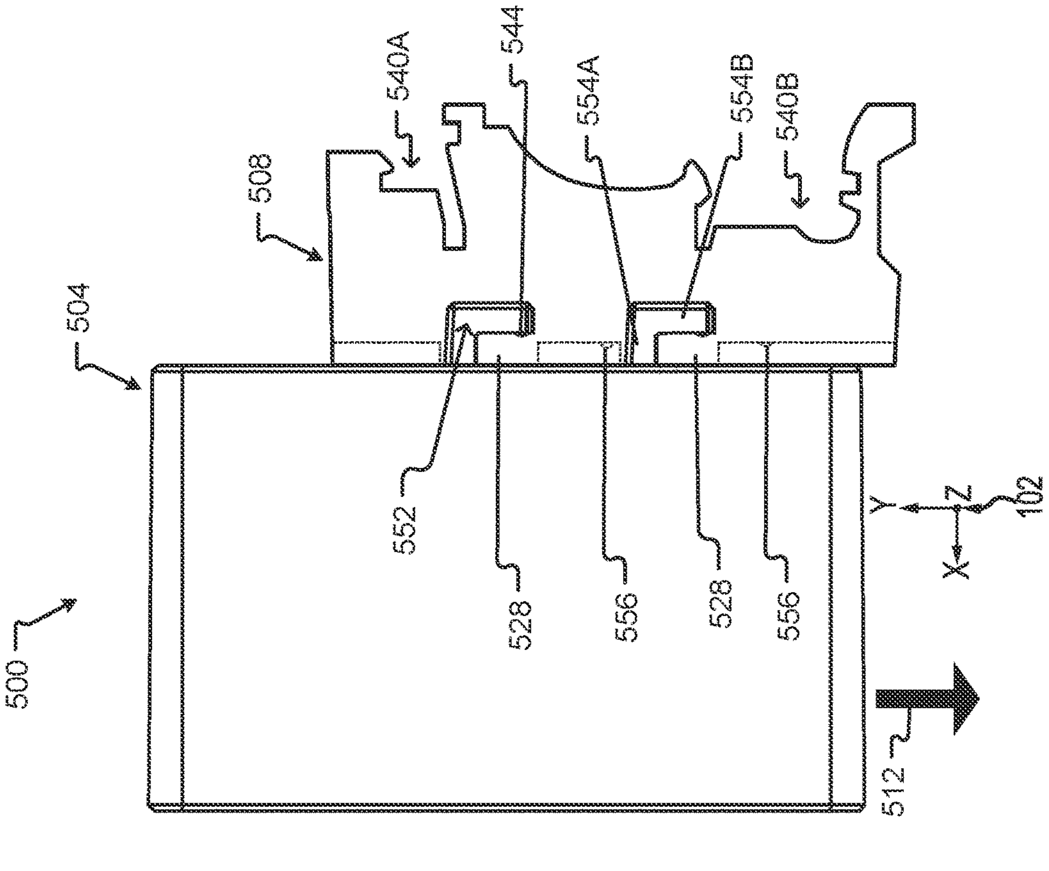
FIG. 5A shows an assembly in a first orientation in accordance with embodiments of the present disclosure.

FIGS. 5A and 5B depict an attachment system 500 in accordance with embodiments of the present disclosure. The attachment system 500 may comprise a fuse holder 504, which may be or comprise a fuse holder 100, fuse holder 200, or storage container 400, or any other storage container or drawer mentioned herein; as well as a base clip 508, which may be similar to or the same as the base clip 300. As shown in FIG. 5A, the fuse holder 504 may be aligned with the base clip 508 such that one or more hooks 552 of the fuse holder 504 pass through one or more holes 528 in the base clip 508. The one or more hooks 552 may be similar to or the same as other hooks described herein (e.g., hooks 152, hooks 252, hooks 452, etc.), and the one or more holes 528 may be similar to or the same as other holes described herein (e.g., one or more holes 328).

The fuse holder 504 may then move in the negative Y-axis direction, as indicated by an arrow 512. The fuse holder 504 may be moved in the negative Y-axis direction until protrusions 544 disposed on vertical portions 554B of the one or more hooks 552 contact, engage, or otherwise snap into place with indentations 556 disposed on the base clip 508, with the horizontal portions 554A of the one or more hooks 552 resting on one or more surfaces forming the holes 528. The contact or engagement of the indentations 556 with the protrusions 544 may prevent the fuse holder 504 from further moving in the Y-axis direction and may effectively couple the fuse holder 504 with the base clip 508. In some embodiments, the indentations 556 may be similar to or the same as the indentations 356. In still further embodiments, the protrusions 544 may be similar to or the same as other protrusions discussed herein (e.g., protrusions 144, protrusions 244, protrusions 444, etc.).

In some embodiments, the protrusions 544 of the base clip 508 may be disposed in both the Y-axis direction and the Z-axis direction (or may otherwise be disposed proximate the one or more holes 528) such that the fuse holder 504 may engage with the base clip 508 when the base clip 508 is in a variety of orientations (e.g., when the base clip 508 is rotated 90 degrees in the YZ-plane from the orientation shown in FIG. 5A, when the base clip 508 is rotated 180 degrees in the YZ-plane from the orientation shown in FIG. 5A, when the base clip 508 is rotated 270 degrees in the YZ-plane from the orientation shown in FIG. 5A, etc.). In some embodiments, the attachment system 500 may, after the connection of the fuse holder 504 and the base clip 508, be further configured to attach to one or more objects in a fuse box (e.g., a rail, a DIN rail, etc.) using the portions of the base clip 508 not engaged with the fuse holder 504, such as first concave portions 540A and second concave portions 540B, both of which may be respectively similar to or the same as first concave portions 340A and second concave portions 340B.

Any of the steps, functions, and operations discussed herein can be performed continuously and automatically.

The exemplary devices, assemblies, and systems of this disclosure have been described in relation to a fuse holder for holding containers with fuses therein. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

References in the specification to "one embodiment," "an embodiment," "an example embodiment," "an exemplary embodiment," "some embodiments," "an aspect," etc., indicate that the embodiment described may include a particular feature, structure, step, or characteristic, but every embodiment may not necessarily include the particular feature, structure, step or characteristic as one or more of the particular features, structures, steps, or characteristics may be optional depending, for example, on a particular implementation or operational environment. Moreover, such phrases are not necessarily referring to the same embodiment. Further, when a particular feature, structure, step, or characteristic is described in conjunction with one embodiment, it is submitted that the description of such feature, structure, step or characteristic may apply to any one or more of the other embodiments described herein.

A number of variations and modifications of the disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

What is claimed is:

1. An attachment system, comprising:

a base clip, comprising:

a first concave portion disposed proximate a top end of the base clip;

a second concave portion disposed proximate a bottom end of the base clip; and a flexible member disposed on the bottom end of the base clip, the flexible member comprising a securing slot and a disconnecting slot; and a fuse holder, the fuse holder comprising:

a top surface;

a bottom surface;

a first sidewall disposed between and connected to the top surface and the bottom surface;

a second sidewall disposed between and connected to the top surface and the bottom surface;

a back panel connected to the top surface, the bottom surface, the first sidewall, and the second sidewall;

a first set of ledges disposed in the first sidewall and extending toward the second sidewall;

a second set of ledges disposed in the second sidewall and extending toward the first sidewall, wherein each ledge of the second set of ledges is aligned with each ledge in the first set of ledges in a first direction; and an attachment mechanism that connects the fuse holder to the base clip, the attachment mechanism comprising one or more hooks that comprise:

a horizontal portion connected to and extending from the back panel in a second direction;

a vertical portion connected to and extending from the horizontal portion in a third direction; and a protrusion disposed on a first surface of the vertical portion, the protrusion extending opposite to the second direction toward the back panel.

2. The system of claim 1, wherein the flexible member extends below a bottom end surface of the bottom end of the base clip in a first direction.

3. The system of claim 1, wherein the disconnecting slot spans a portion of the flexible member in the first direction.

4. The system of claim 1, wherein the flexible member moves from a first position to a second position, wherein, when the flexible member is in the first position, the securing slot contacts a first surface of a rail, and wherein, when the flexible member is in the second position, the securing slot is positioned a first distance from the first surface of the rail.

5. The system of claim 4, wherein the base clip further comprises:

one or more holes disposed on a front end of the base clip, wherein the one or more holes interface with the one or more hooks of the attachment mechanism to connect the fuse holder to the base clip.

6. The system of claim 5, wherein the fuse holder moves from a first position to a second position, and wherein the protrusion of the vertical portion contacts a first inner surface of the base clip when the fuse holder is in the second position.

7. The system of claim 1, wherein the first set of ledges comprises at least four ledges, and wherein the second set of ledges comprises at least four ledges.

* * * * *